(12) United States Patent
Kang et al.

(10) Patent No.: US 12,182,409 B2
(45) Date of Patent: Dec. 31, 2024

(54) BACKWARD COMPATIBLE PROCESSING-IN-MEMORY (PIM) PROTOCOL

(71) Applicant: SAMSUNG ELECTRONICS CO., LTD., Suwon-si (KR)

(72) Inventors: Shinhaeng Kang, Suwon-si (KR); Sukhan Lee, Suwon-si (KR); Hweesoo Kim, Suwon-si (KR); Kyomin Sohn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 30 days.

(21) Appl. No.: 17/938,789

(22) Filed: Oct. 7, 2022

(65) Prior Publication Data

US 2023/0128183 A1    Apr. 27, 2023

(30) Foreign Application Priority Data

Oct. 27, 2021  (KR) ................. 10-2021-0144974
Jun. 9, 2022   (KR) ................. 10-2022-0070298

(51) Int. Cl.
    *G06F 3/06*    (2006.01)
(52) U.S. Cl.
    CPC .......... *G06F 3/0613* (2013.01); *G06F 3/0653* (2013.01); *G06F 3/0673* (2013.01)
(58) Field of Classification Search
    None
    See application file for complete search history.

(56) References Cited

U.S. PATENT DOCUMENTS

| 9,836,277 B2 | 12/2017 | Guz et al. |
| 10,049,721 B1 | 8/2018 | Lea et al. |
| 10,585,624 B2 | 3/2020 | Walker et al. |
| 10,592,467 B2 * | 3/2020 | Ryu ............... G06F 15/785 |

(Continued)

FOREIGN PATENT DOCUMENTS

| KR | 10-2020-0046270 | 5/2020 |
| KR | 10-2021-0122667 | 10/2021 |

(Continued)

OTHER PUBLICATIONS

EESR dated Mar. 20, 2023 In Corresponding EP Patent Application No. 22199532.7.

(Continued)

*Primary Examiner* — Yaima Rigol
(74) *Attorney, Agent, or Firm* — F. Chau & Associates, LLC

(57) ABSTRACT

A memory device supporting a processing-in-memory (PIM) protocol includes a mode register set (MRS) configured to store a first parameter code and a second parameter code regarding the PIM protocol in a first register and a second register, respectively. The first parameter code includes a PIM protocol change code indicating whether a PIM protocol change related to an old version PIM protocol is supported, and the second parameter code includes a PIM protocol code for setting a current operation PIM protocol from among a plurality of PIM protocols. The memory device further includes a PIM circuit configured to perform an internal processing operation based on the current operation PIM protocol.

20 Claims, 15 Drawing Sheets

(56) References Cited

U.S. PATENT DOCUMENTS

| | | | |
|---|---|---|---|
| 11,068,200 B2 | 7/2021 | Niu et al. | |
| 2017/0263306 A1 | 9/2017 | Murphy | |
| 2019/0206478 A1 | 7/2019 | Jun | |
| 2020/0174676 A1 | 6/2020 | Malladi et al. | |
| 2021/0210125 A1* | 7/2021 | Song | G06F 7/5443 |
| 2021/0279008 A1 | 9/2021 | Lea et al. | |
| 2021/0311739 A1 | 10/2021 | Malladi et al. | |

FOREIGN PATENT DOCUMENTS

| | | |
|---|---|---|
| TW | I660362 | 5/2019 |
| TW | I672631 | 9/2019 |

OTHER PUBLICATIONS

Sukhan Lee, et al., "Hardware Architecture and Software Stack for PIM Based on Commercial DRAM Technology", 2021 ACM/IEEE 48th Annual International Symposium on Computer Architecture (ISCA).

* cited by examiner

S0/S1/S1.5 Protocol

FIG. 6

| Command | Symbol | CK edge | R[0] | R[1] | R[2] | R[3] | R[4] | R[5] | R[6] | R[7] | R[8] | R[9] |
|---|---|---|---|---|---|---|---|---|---|---|---|---|
| Activate | ACT | R | L | H | H | PC | SID0 | SID1 | BA0 | BA1 | BA2 | BA3 |
| | | F | H | H | RA8 | RA9 | RA10 | RA11 | RA12 | RA13 | RA14 | V |
| | | R | H | H | RA0 | RA1 | RA2 | RA3 | RA4 | RA5 | RA6 | RA7 |
| | | F | | | | | | | | | | |
| Precharge | PREpb | R | H | L | L | PC | SID0 | SID1 | BA0 | BA1 | BA2 | BA3 |
| | | F | | | | | | | | | | |
| Precharge All | PREab | R | H | L | H | PC | V | V | V | V | V | V |
| | | F | | | | | | | | | | |

| Command | Symbol | CK edge | C[0] | C[1] | C[2] | C[3] | C[4] | C[5] | C[6] | C[7] | RFU |
|---|---|---|---|---|---|---|---|---|---|---|---|
| Read | RD | R | H | L | H | L | PC | SID0 | SID1 | BA0 | L |
| | | F | BA1 | BA2 | BA3 | CA0 | CA1 | CA2 | CA3 | CA4 | L |
| Write | WR | R | H | L | L | L | PC | SID0 | SID1 | BA0 | L |
| | | F | BA1 | BA2 | BA3 | CA0 | CA1 | CA2 | CA3 | CA4 | L |
| Mode Register Set | MRScmd | R | L | L | L | OP5 | OP6 | OP7 | OP8 | BA0 | L |
| | | F | BA1 | BA2 | BA3 | OP0 | OP1 | OP2 | OP3 | OP4 | L |

| Command | Symbol | CK edge | R[0] | R[1] | R[2] | R[3] | R[4] | R[5] | R[6] | R[7] | R[8] | R[9] |
|---|---|---|---|---|---|---|---|---|---|---|---|---|
| Activate Multi Bank | ACTMb | R | L | H | H | PC | SID0 | SID1 | BC0 | BC1 | BC2 | BC3 |
| | | F | H | L | RA8 | RA9 | RA10 | RA11 | RA12 | RA13 | RA14 | SIDM |
| | | R | H | L | RA0 | RA1 | RA2 | RA3 | RA4 | RA5 | RA6 | RA7 |
| Precharge Multi Bank | PREMb | R or F | H | L | H | PC | SID0 | SID1 | MB_SEL | V | V | SIDM |

720

| Function | Symbol | CK edge | RFU (PIM) | C[0] | C[1] | C[2] | C[3] | C[4] | C[5] | C[6] | C[7] |
|---|---|---|---|---|---|---|---|---|---|---|---|
| PIM Execution | PIM_x | R | H | L | L | IID0 | IID1 | PC | SID0 | SID1 | BA0 |
| | | F | IID2 | IID3 | IID4 | IID5 | CA0 | CA1 | CA2 | CA3 | CA4 |
| Write PIM Broadcast | WRPB | R | H | L | H | RID0 | RID1 | PC | SID0 | SID1 | H |
| | | F | RID2 | V | V | V | RID3 | RID4 | RID5 | RID6 | RID7 |
| Write PIM (Single PIM Unit) | WRP | R | H | L | H | RID0 | RID1 | PC | SID0 | SID1 | L |
| | | F | RID2 | BA1 | BA2 | BA3 | RID3 | RID4 | RID5 | RID6 | RID7 |
| PIM Read (Single PIM Unit) | RDP | R | H | H | L | RID0 | RID1 | PC | SID0 | SID1 | V |
| | | F | RID2 | BA1 | BA2 | BA3 | RID3 | RID4 | RID5 | RID6 | RID7 |
| Read-Modify-Write | RMW | R | H | H | H | H | POP0 | PC | SID0 | SID1 | BA0 |
| | | F | POP1 | BA1 | BA2 | BA3 | CA0 | CA1 | CA2 | CA3 | CA4 |

FIG. 9
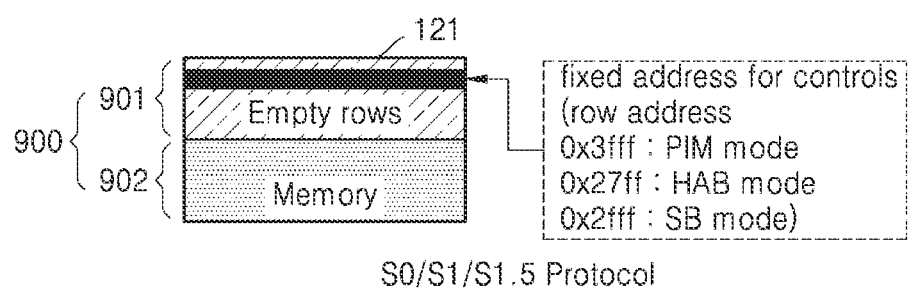
S0/S1/S1.5 Protocol
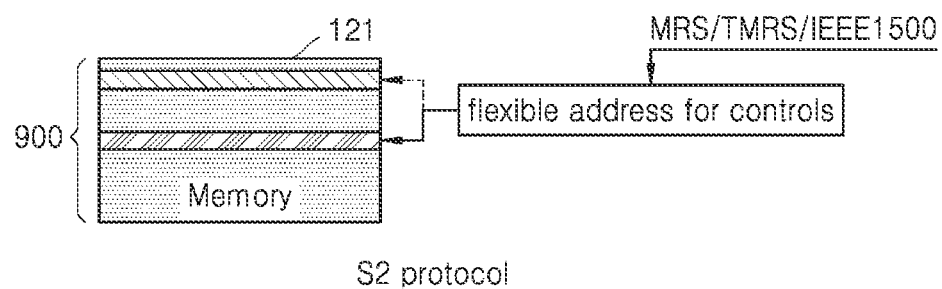
S2 protocol

BACKWARD COMPATIBLE PROCESSING-IN-MEMORY (PIM) PROTOCOL

CROSS-REFERENCE TO RELATED APPLICATIONS

This application is based on and claims priority under 35 U.S.C. § 119 to Korean Patent Application Nos. 10-2021-0144974, filed on Oct. 27, 2021, and 10-2022-0070298, filed on Jun. 9, 2022, in the Korean Intellectual Property Office, the disclosures of which are incorporated by reference herein in their entireties.

TECHNICAL FIELD

Embodiments of the inventive concept relate to semiconductor memory devices, and more particularly, to a memory device supporting a backward compatible processing-in-memory (PIM) protocol, and a method of operating the same.

DISCUSSION OF RELATED ART

Applications, such as high performance and/or graphics algorithms, are data-intensive and compute-intensive. Applications, such as deep neural networks, require a computing system with large computational and memory capabilities to more accurately train or learn different data sets. To perform some computational operations of a computing system through internal processing, a processor-in-memory type (PIM) processor device is being developed. Through a PIM processing operation of a memory device, the computational operation load of a computing system may be reduced.

SUMMARY

Embodiments of the inventive concept provide a memory device supporting a backward-compatible PIM protocol without complicated hardware and software changes, and a method of operating the same.

According to an embodiment of the inventive concept, there is provided a memory device supporting a processing-in-memory (PIM) protocol. The memory device includes a mode register set (MRS) configured to store a first parameter code and a second parameter code regarding the PIM protocol in a first register and a second register, respectively. The first parameter code includes a PIM protocol change code indicating whether a PIM protocol change related to an old version PIM protocol is supported, and the second parameter includes a PIM protocol code for setting a current operation PIM protocol from among a plurality of PIM protocols. The memory device further includes a PIM circuit configured to perform an internal processing operation based on the current operation PIM protocol.

According to an embodiment of the inventive concept, there is provided a host device coupled to a memory device performing internal processing operations through a bus. The host device includes a memory controller configured to enable the memory device to support a processing-in-memory (PIM) protocol change associated with an old version PIM protocol, and to set a current operation PIM protocol from among a plurality of PIM protocols. The host device is configured such that a PIM circuit of the memory device performs a part of a processing operation of the host device as an internal processing operation based on the current operation PIM protocol.

According to an embodiment of the inventive concept, there is provided a method of supporting a backward compatible processing-in-memory (PIM) protocol for a memory device, which is connected to a host device through a bus and includes a PIM circuit. The method includes storing, by the memory device, a first parameter code for a PIM protocol in a first register of a mode register set (MRS) via a bus. The first parameter code includes a PIM protocol change code indicating whether a PIM protocol change associated with an old version PIM protocol is supported. The method further includes storing, by the memory device, a second parameter code regarding the PIM protocol in the first register of the MRS via the bus. The second parameter includes a PIM protocol code for setting a current operation PIM protocol from among a plurality of PIM protocols. The method further includes performing, by the memory device, an internal processing operation in the PIM circuit based on the current operation PIM protocol.

BRIEF DESCRIPTION OF THE DRAWINGS

Embodiments of the inventive concept will be more clearly understood from the following detailed description taken in conjunction with the accompanying drawings, in which:

FIG. 6 is a diagram illustrating commands according to a typical high-bandwidth memory (HBM) specification;

FIG. 7 is a diagram illustrating commands according to a typical PIM specification;

FIG. 9 is a diagram illustrating memory allocation according to a typical PIM protocol;

DETAILED DESCRIPTION OF THE EMBODIMENTS

Figure 1:
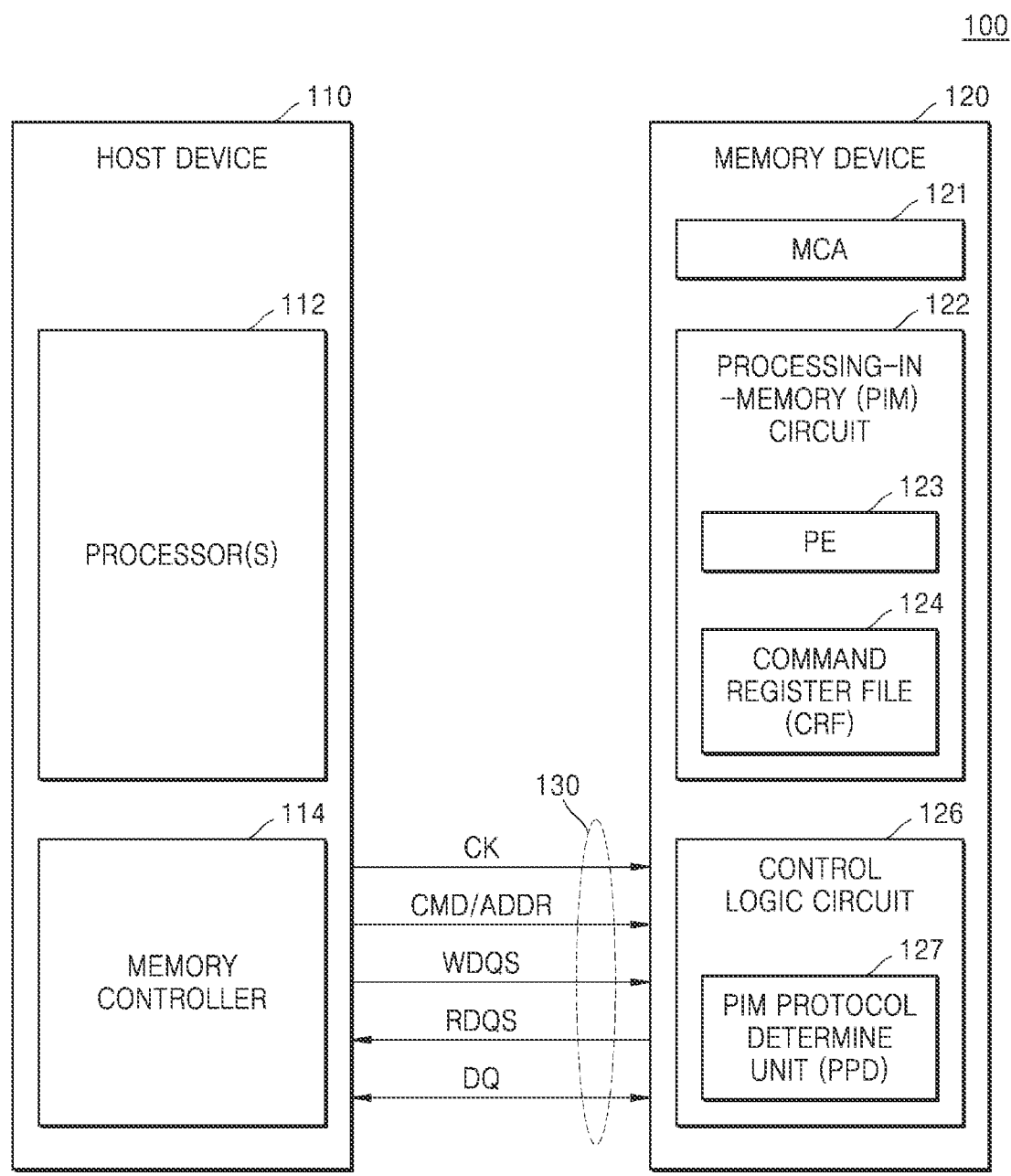
FIG. 1 is a diagram illustrating a system including a memory device that performs an internal processing operation according to embodiments.

Embodiments of the inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

It will be understood that when a component is referred to as being "connected to" another component, it can be directly connected to the other component, or intervening components may be present, unless the context clearly indicates otherwise. Other words used to describe the relationships between components should be interpreted in a like fashion.

FIG. 1 is a diagram illustrating a system including a memory device that performs an internal processing operation according to embodiments.

Referring to FIG. 1, a system 100 may be configured to execute applications for high-performance computing, graphics operations, etc., or applications for learning systems, such as, for example, deep neural networks. These applications utilize high computational and memory capabilities to, for example, execute jobs or tasks cooperatively in a parallel fashion, train different data sets, and learn with high accuracy, where power efficiency and low latency are considerations.

The system 100 may include a host device 110 and a memory device 120. The host device 110 may be used to solve an overall job or task through a parallel processing approach in which the overall job or task is divided into smaller jobs that are executed in parallel by a large number of computing entities (e.g., processors, cores in the processors, and a processing-in-memory (PIM) circuit 122). A task may include a plurality of jobs organized in a structure, such as a hierarchical structure, and the task may refer to, for example, executable code to be executed by a computing entity, data to be processed, and data to be retrieved from the memory device 120 by the computing entity, manipulated by executing code, and to be stored.

The host device 110 may be communicatively connected to the memory device 120 via a bus 130. The host device 110 may be, for example, a computing system, such as a computer, a laptop computer, a server, a workstation, a portable communication terminal, a personal digital assistant (PDA), a portable multimedia player (PMP), a smartphone, or a wearable device. Alternatively, the host device 110 may be one of components included in a computing system, e.g., a graphics card.

The host device 110 may include a processor(s) 112 for performing general computer operations in the system 100, and a memory controller 114 for managing data transmission/reception to/from the memory device 120. The processor(s) 112 is a primary component of the system 100 that processes and manages instructions and is mainly responsible for executing an operating system and applications. Also, the processor(s) 112 may enable a workload to be distributed across a plurality of computing entities to be processed in parallel to solve a complex job or task. The processor(s) 112 may include a processing unit such as, for example, a central processing unit (CPU), a digital signal processor (DSP), a graphics processing unit (GPU), an encryption processing unit, a physical processing unit, a machine learning processing unit, etc.

The processor(s) 112 may increase efficiency by distributing execution of various computational tasks, instructions, or kernels to other processors or offloading them to the memory device 120. A kernel is defined as one or more instructions that are grouped together to execute a task or definable sub-task. The PIM circuit 122 of the memory device 120 may perform calculation processing by a kernel offloaded by the processor(s) 112. Various types of calculation processing operations may be performed by the PIM circuit 122. For example, at least some of neural network operations in relation to artificial intelligence may be performed by the PIM circuit 122. For example, the processor(s) 112 may control the memory device 120 via the memory controller 114, such that at least some of neural network operations may be performed by the PIM circuit 122.

The memory controller 114 may access the memory device 120 according to a memory request of the host device 110. The memory controller 114 may control a write operation or a read operation for the memory device 120 by providing a command CMD and an address ADDR to the memory device 120. Also, data DQ to be written and read data DQ may be transmitted and received between the memory controller 114 and the memory device 120. Such a memory access operation may be performed through the bus 130 between the memory controller 114 and the memory device 120.

The bus 130 may include clock signal lines for transmitting a main clock signal CK, a write data strobe signal WDQS, and a read data strobe signal RDQS, command/address signal lines for transmitting commands/addresses CMD/ADDR, and data lines for transmitting data DQ. The bus 130 may operate in a high bandwidth memory (HBM) specification and/or in a PIM specification under control of the host device 110 (e.g., the memory controller 114). For simplicity of the drawings, it is illustrated that command/address signal lines and data lines are single lines between the memory controller 114 and the memory device 120, but according to embodiments, the command/address signal lines and the data lines may be a plurality of signal lines. The bus 130 may be implemented as one channel including a plurality of signal lines or a plurality of channels. The bus 130 may be referred to as a channel, and, in embodiments below, the bus 130 and a channel may be used as interchangeable terms.

The memory device 120 may write data or read data under control of the memory controller 114. For example, the memory device 120 may be a DDR synchronous dynamic random access memory (SDRAM) device. However, the inventive concept is not limited thereto, and the memory device 120 may be any one of volatile memory devices, such as, for example, LPDDR SDRAM, wide I/O DRAM, a high bandwidth memory (HBM), and a hybrid memory cube (HMC).

According to embodiments, the memory device 120 may be any one of non-volatile memory devices, such as, for example, flash memory, phase-change RAM (PRAM), magnetic RAM (MRAM), resistive RAM (RRAM), and ferroelectric RAM (FRAM).

The memory device 120 may operate in any one of the normal mode and the internal processing mode. The normal mode refers to an operation mode in which general data transaction operations are performed under control of the memory controller 114, and the internal processing mode refers to an operation mode in which internal processing operations are performed under control of the memory controller 114. In a data transaction operation, the memory device 120 may perform a command and address reception operation and a data exchange operation according to normal mode timing parameters defined in protocols such as, for example, DDR, LPDDR, and/or HBM under control of the memory controller 114. In an internal processing operation, the memory device 120 may perform a command and address reception operation and a data exchange operation according to internal processing mode timing parameters defined in a PIM protocol under control of the memory controller 114. The normal mode timing parameters and the internal processing mode timing parameters may be set differently. According to some embodiments, the internal processing mode timing parameters may be set as relatively smaller values than the normal mode timing parameters.

The memory device 120 may include a memory cell array (MCA) 121, the PIM circuit 122, and a control logic circuit 126. The MCA 121 may include a plurality of word lines, a plurality of bit lines, and a plurality of memory cells formed at points where the word lines intersect with the bit lines. The memory cells may each include a DRAM cell including one access transistor and one storage capacitor. The MCA 121 may include a plurality of memory banks.

The PIM circuit 122 may include one or more processing elements 123 configured to execute a kernel offloaded by the host device 110. The host device 110 (e.g., the memory controller 114) may initiate an internal processing operation of the PIM circuit 122 by issuing a PIM command via the bus 130. The PIM circuit 122 is hardware having processing functionality, similar to the processor(s) 112 included in the host device 110. When the PIM circuit 122 is referred to as an internal processor, the term "internal" means that the PIM circuit 122 is in the memory device 120. Therefore, a processor "outside" the memory device 120 may refer to, for example, the processor(s) 112 of the host device 110.

The PIM circuit 122 may include a command register file (CRF) 124 that stores a PIM command provided from the host device 110 (e.g., the memory controller 114). A PIM command refers to a command for an internal processing operation performed by the PIM circuit 122. The CRF 124 may store PIM commands, e.g., PIM_Load, PIM_Store, PIM_Read, PIM_Write, PIM_RMW, PIM_Instruction, etc.

PIM_Load may be a command indicating movement of reference data or target data of an internal processing operation. Data may be read from the MCA 121 and provided to the PIM circuit 122 according to the PIM_Load command. PIM_Store may be a command indicating movement of result data of processing of an internal processing operation. Internal processing data of the PIM circuit 122 may be stored in the MCA 121 according to the PIM_Store command. PIM_Read may be a PIM read command for outputting internal processing data of the PIM circuit 122 to the host device 110 (e.g., the memory controller 114). PIM_Write may be a PIM write command for inputting reference data, target data, or target data of an internal processing operation provided from the host device 110 (e.g., the memory controller 114) to the PIM circuit 122. PIM_RMW may be a PIM read-modify-write command for masking a part of reference data or target data of an internal processing operation from being input to the PIM circuit 122. PIM_Instruction is a PIM execution command instructing to execute a PIM command stored in the CRF 124 and may be referred to as a PIM_x (x is an index) command.

The control logic circuit 126 may include a PIM protocol controlling the overall operation of the memory device 120 and may include a PIM protocol determiner (PPD) 127, which determines a PIM protocol set between the host device 110 (e.g., the memory controller 114) and the memory device 120. The PPD 127 may analyze and detect which PIM protocol the memory device 120 is configured to operate with.

In some embodiments, the PPD 127 may determine a PIM protocol based on a PIM protocol change code indicating whether an old version PIM protocol set to a mode register set (MRS) 320 of the memory device 120 and a PIM protocol code for setting a current operation PIM protocol from among a plurality of PIM protocols.

In some embodiments, the PPD 127 may analyze and detect which bank architecture the memory device 120 is configured to operate with according to the current operation PIM protocol.

In some embodiments, the PPD 127 may determine a bank architecture based on all bank architecture codes set in the MRS 320 or half-bank architecture codes divided into even/odd banks.

In some embodiments, the PPD 127 may analyze and detect which of a row address pattern, a column address, and a data pattern a PIM enter/exit code indicated to identify entry or exit of a PIM mode for processing an internal processing operation in relation to the current operation PIM protocol is set to.

In some embodiments, the PPD 127 may analyze and detect a PIM entry pattern for entering a PIM mode and a PIM exit pattern for exiting a PIM mode in relation to the PIM enter/exit code.

In some embodiments, the host device 110 (e.g., the memory controller 114) may set a PIM protocol change code, a PIM protocol code, a bank operation code, a PIM enter/exit code, or a PIM enter/exit pattern by using a specifiable test MRS (TMRS) or an IEEE1500 interface for testing the memory device 120. The PPD 127 may analyze and detect which PIM protocol the memory device 120 is set to operate with by using a TMRS or an IEEE1500 interface.

The PIM circuit 122 may perform a PIM internal processing operation according to a result of analyzing and detecting a PIM protocol by the PPD 127. In an embodiment, it will be described that the PPD 127 determines a current operation PIM protocol, but embodiments are not limited thereto. For example, it may be described that the PPD 127 corresponds to a component provided in the control logic circuit 126 and the control logic circuit 126 determines a current operation PIM protocol.

Figure 2:
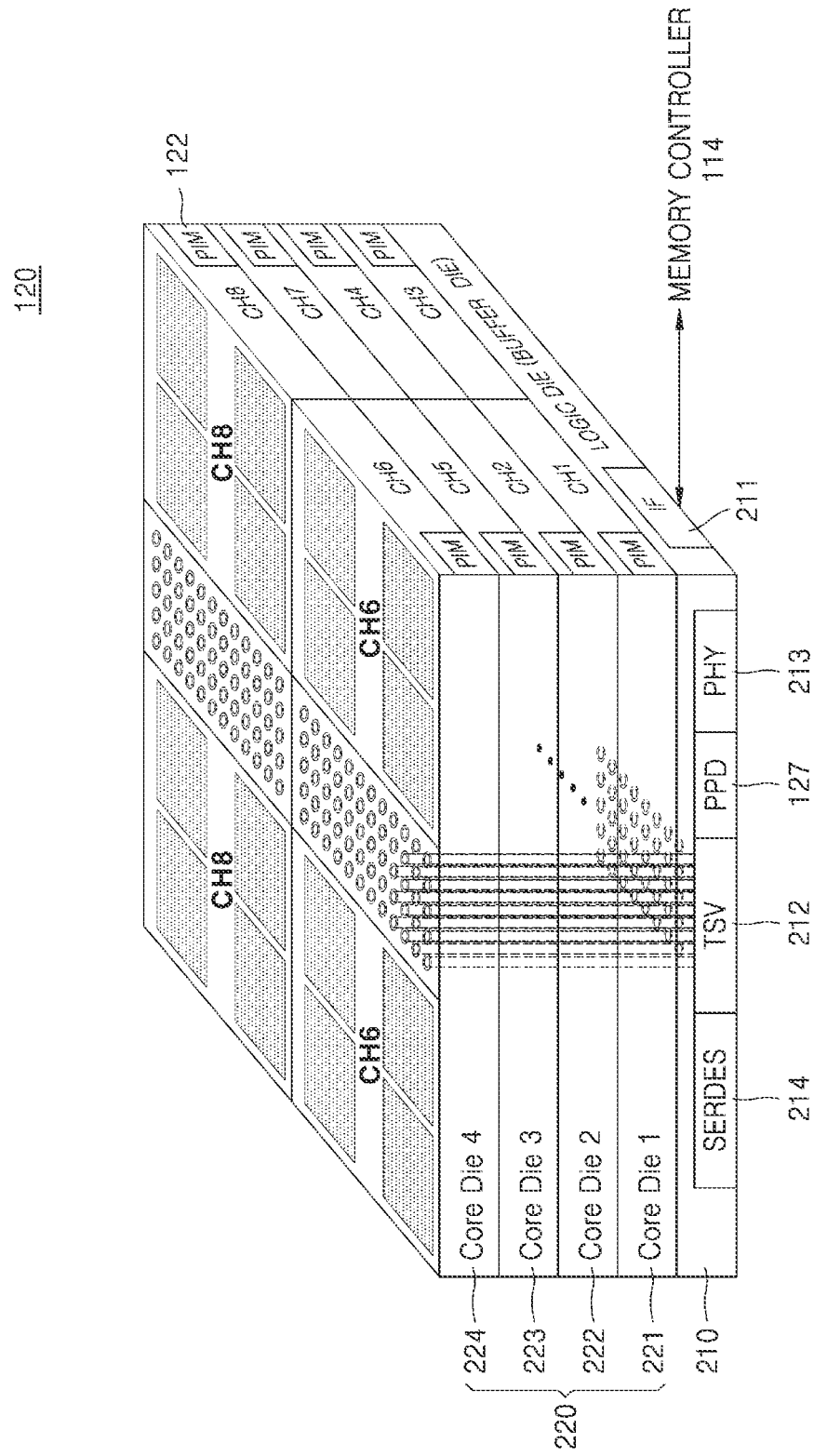
FIG. 2 is a diagram illustrating a memory device according to an embodiment.

FIG. 2 is a diagram illustrating a memory device according to an embodiment. FIG. 2 shows the memory device 120 of FIG. 1 implemented as an HBM. The HBM configuration shown in FIG. 2 is provided as an example, and, embodiments of the inventive concept are not limited thereto. Hereinafter, for convenience of explanation, the term memory device 120 may be used interchangeably with the term HBM 120.

Referring to FIGS. 1 and 2, the HBM 120 may be connected to the host device 110 through a Joint Electron Device Engineering Council (JEDEC)-standard HBM protocol. The HBM protocol is a high-performance random access memory (RAM) interface for 3-dimensionally stacked memories (e.g., DRAM). Also, the HBM 120 may be connected to the host device 110 through a JEDEC-standard PIM protocol. The PIM protocol is an interface for the PIM circuit 122 of the HBM 120. The HBM 120 generally consumes less power and achieves a wider bandwidth with a form factor substantially smaller than other DRAM technologies (e.g., DDR4, GDDR5, etc.).

The HBM 120 may have a high bandwidth by including a plurality of channels CH1 to CH8 having interfaces independent from one another. The HBM 120 may include a plurality of dies (e.g. a logic die 210 and one or more core dies 220). According to an embodiment, the HBM 120 may include a logic die (or buffer die) 210 and one or more core dies 220 stacked on the logic die 210. Although FIG. 2 shows an example in which first to fourth core dies 221 to 224 are provided in the HBM 120, the number of core dies 220 may be variously changed. The core dies 220 may also be referred to as memory dies.

The first to fourth core dies 221 to 224 may each include one or more channels. FIG. 2 shows an example in which, as the first to fourth core dies 221 to 224 each include two channels, the HBM 120 has eight channels CH1 to CH8. For example, the first core die 221 may include a first channel CH1 and a third channel CH3, the second core die 222 may include a second channel CH2 and a fourth channel CH4, the third core die 223 may include a fifth channel CH5 and a seventh channel CH7, and the fourth core die 224 may include a sixth channel CH6 and an eighth channel CH8.

The logic die 210 may include an interface circuit 211 that communicates with the host device 110, and commands/addresses and data may be received from the host device 110 (e.g., the memory controller 114) via the interface circuit 211. The host device 110 may transmit commands/addresses and data through bus(es) 130 arranged in correspondence to the channel(s) CH1 to CH8. According to embodiments, buses 130 may be formed in correspondence to the respective channels CH1 to CH8, or some of buses 130 may each be shared by at least two channels. The interface circuit 211 may transmit commands/addresses and data to a channel through which the host device 110 requests a memory operation or a calculation processing. Also, the core dies 220 or channels may each include the PIM circuit 122 according to an embodiment.

The host device 110 may provide commands/addresses and data, such that at least some of a plurality of calculation tasks or kernels may be performed in the HBM 120, and a calculation processing may be performed by the PIM circuit 122 of a channel designated by the host device 110. According to an embodiment, when received commands/addresses indicate a calculation processing, the PIM circuit 122 of a corresponding channel may perform the calculation processing by using data read from the corresponding channel, and write back a result of the calculation processing to the corresponding channel. According to an embodiment, when commands/addresses received through a corresponding channel of the HBM 120 instructs a memory operation, an access operation for data may be performed.

According to an embodiment, the channels CH1 to CH8 may each include a plurality of banks, and one or more processing elements PE may be provided in the PIM circuit 122 of each channel. According to an embodiment, the number of processing elements PE in each channel may be the same as the number of banks. Alternatively, as the number of processing elements PE is less than the number of banks, one processing element PE may be shared by at least two banks. The PIM circuit 122 of each channel may execute instructions of a kernel offloaded by the host device 110.

In addition, the logic die 210 may further include a through silicon via (TSV) region 212, an HBM physical layer interface (HBM PHY) region 213, a SERializer/DE-Serializer (SERDES) region 214, and the PPD 127. The TSV region 212 is a region in which TSVs for communication with the core dies 220 are formed and a region in which the bus(es) 130 arranged in correspondence to the channel(s) CH1 to CH8 are formed. When the channels CH1 to CH8 each have, for example, a bandwidth of 128 bits, the TSVs may include components for inputting/outputting data of 1024 bits.

The HBM PHY region 213 may include a plurality of input/output circuits for communication with the memory controller 114 and the channels CH1 to CH8. According to an embodiment, the HBM PHY region 213 may include one or more interconnect circuits for interconnecting the memory controller 114 and the channels CH1 to CH8. The HBM PHY region 213 may include a physical or electrical layer and a logical layer provided for signals, frequencies, timings, driving parameters, detailed operation parameters, and functionality utilized for efficient communication between the memory controller 114 and the channels CH1 to CH8. The HBM PHY region 213 may perform memory interfacing, such as selecting a row and a column corresponding to a memory cell, writing data to a memory cell, or reading written data with respect to a corresponding channel. The HBM PHY region 213 may support features of a JEDEC-standard HBM protocol and/or a JEDEC-standard PIM protocol.

The SERDES region 214 is a region providing a JEDEC-standard SERDES interface due to increased processing throughput of the processor(s) 112 of the host device 110 and increasing demands on memory bandwidths. The SERDES region 214 may include a SERDES transmitter portion, a SERDES receiver portion, and a controller portion. The SERDES transmitter portion may include, for example, a parallel-to-serial circuit and a transmitter, receive a parallel data stream, and serialize the received parallel data stream. The SERDES receiver portion may include, for example, a receiver amplifier, an equalizer, a clock, a data recovery circuit, and a serial-to-parallel circuit, receive a serial data stream, and parallelize the received serial data stream. The controller portion may include an error detection circuit, an error correction circuit, and registers such as First-In-First-Outs (FIFOs).

The PPD 127 may be configured to determine whether a backward-compatible PIM protocol is supported. The PPD 127 may determine a current operation PIM protocol set from among a plurality of PIM protocols by analyzing, for example, a PIM protocol change code, a PIM protocol code, a bank operation code, a PIM enter/exit code, and/or a PIM enter/exit pattern exchanged through the HBM PHY region 213.

Figure 8:
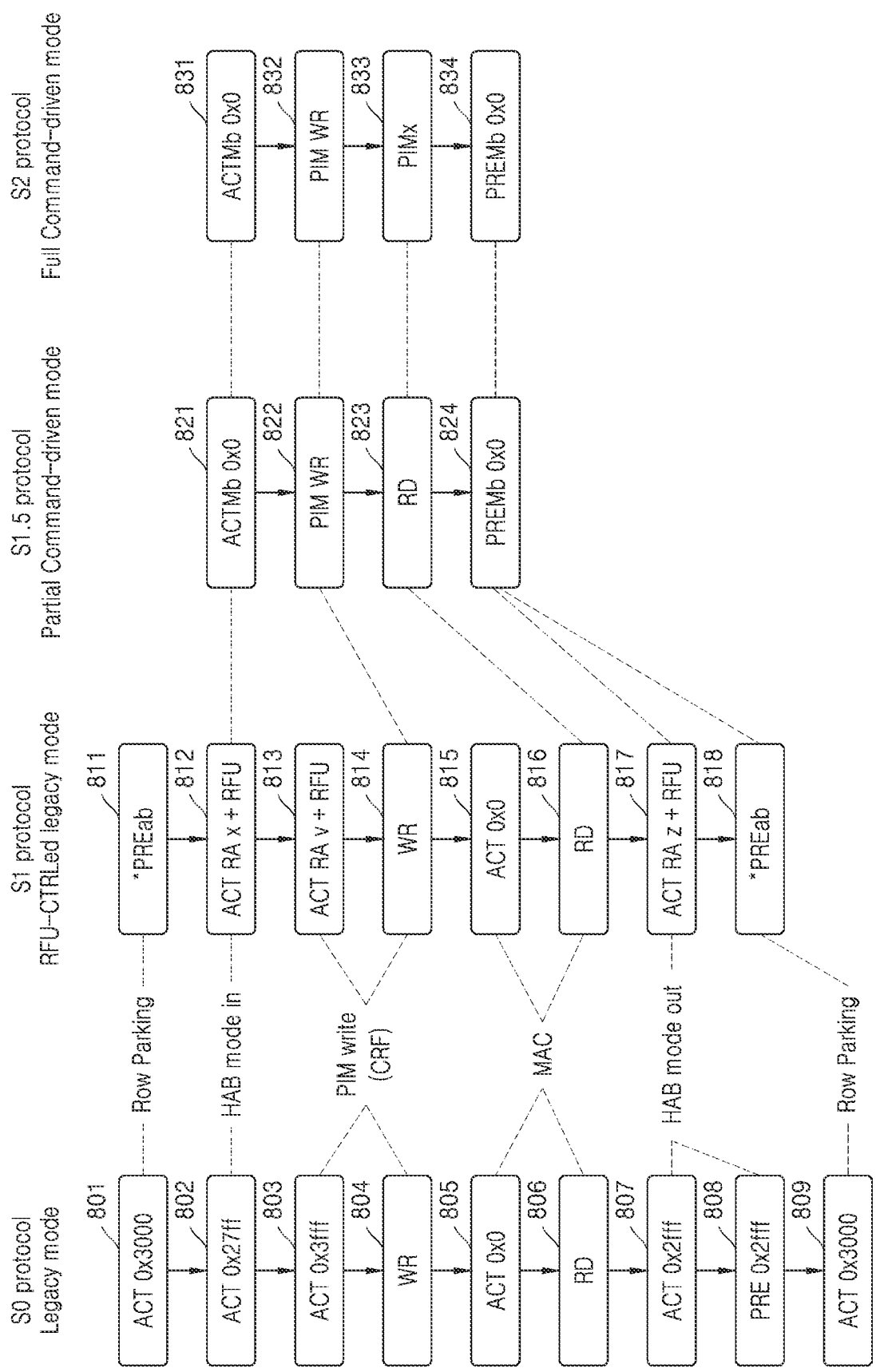
FIG. 8 is a diagram illustrating an internal processing operation according to a typical PIM protocol.

According to an embodiment, the current operation PIM protocol may be set to an S2 protocol corresponding to a full command driving mode for performing an internal processing operation, according to a PIM command used for an internal processing operation of the PIM circuit 122, as shown in FIG. 8.

According to an embodiment, an old version PIM protocol, as shown in FIG. 8, which illustrates performing an internal processing operation of the PIM circuit 122 by using a normal command used for a memory operation and a particular row address, may be set to any one of an S0 protocol corresponding to a PIM control legacy mode configured for the memory device 120 to perform an internal processing operation of the PIM circuit 122, an S1 protocol corresponding to an RFU control legacy mode configured for the memory device 120 to perform an internal processing operation of the PIM circuit 122 by further using a reserved-for-future-use (RFU) pin as compared to the PIM protocol legacy mode, and an S1.5 protocol corresponding to a partial command driving mode configured for the memory device 120 to perform an internal processing operation of the PIM circuit 122 by using some of PIM commands.

Figure 3:
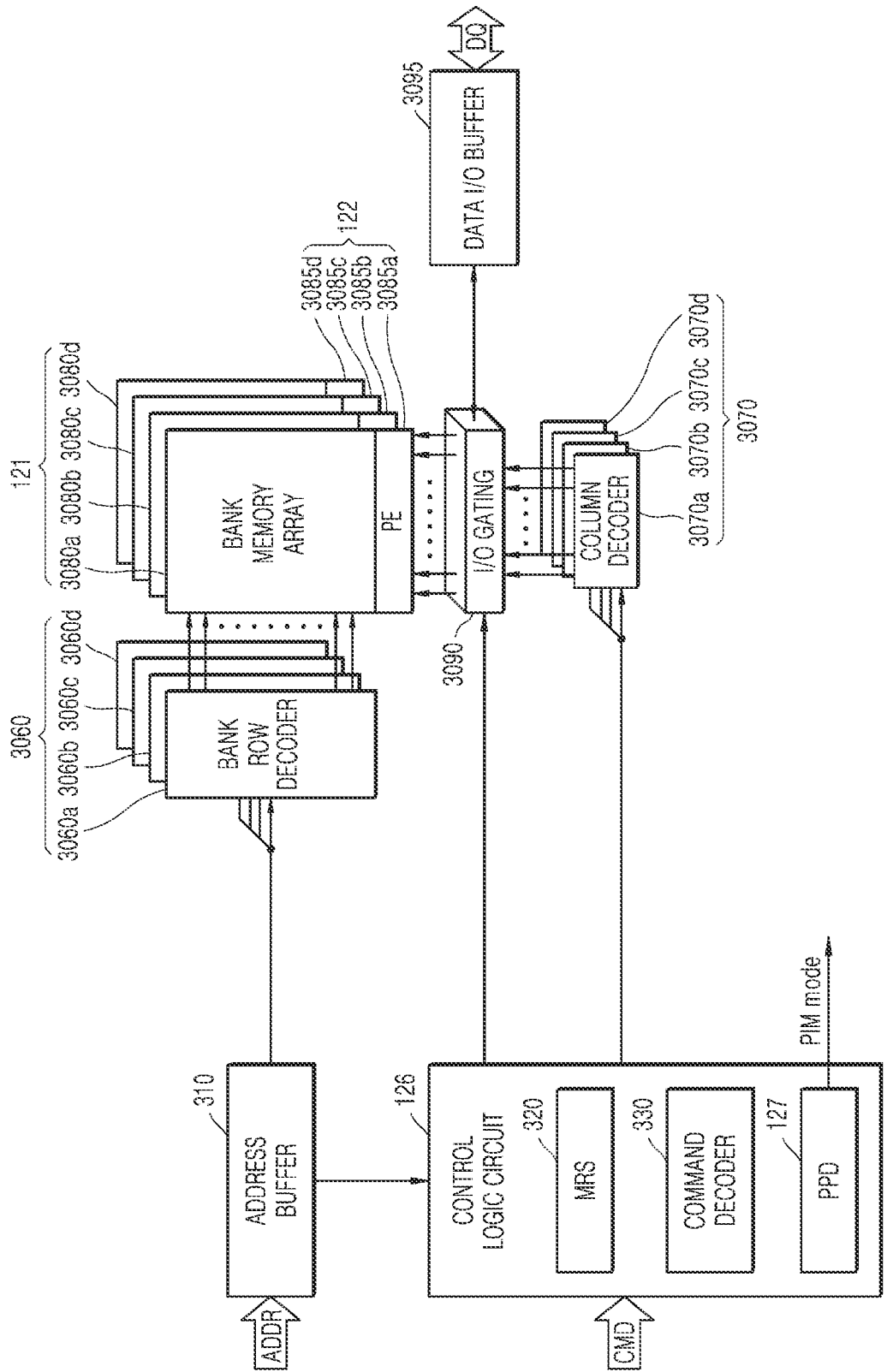
FIG. 3 is a block diagram illustrating the configuration of a memory device according to an embodiment.

FIG. 3 is a block diagram illustrating the configuration of a memory device according to an embodiment. FIG. 3 shows a representative configuration of a first channel CH1 from among the channels CH1 to CH8 in the HBM of FIG. 2. The configuration of the first channel CH1 may be equally applied to the remaining channels CH2 to CH8. Also, the configuration of the first channel CH1 may be equally applied to the memory device 120 (FIG. 1) implemented as a stand-alone type DDR and/or LPDDR DRAM.

Referring to FIG. 3, the first channel CH1 may include an address buffer 310, the control logic circuit 126, the PIM circuit 122, a row decoder 3060, a column decoder 3070, and the MCA 121, an input/output (I/O) gating circuit 3090, and a data I/O buffer 3095. According to an embodiment, the first channel CH1 may further include a clock buffer, a refresh control circuit, a voltage generating circuit, a bank control logic, etc.

The MCA 121 may include first to fourth bank arrays 3080a, 3080b, 3080c, and 3080d. The first to fourth bank arrays 3080a, 3080b, 3080c, and 3080d may each include a plurality of word lines, a plurality of bit lines, and a plurality of memory cells respectively formed at intersections of the word lines and the bit lines.

The row decoder 3060 may include first to fourth bank row decoders 3060a, 3060b, 3060c, and 3060d respectively connected to the first to fourth bank arrays 3080a, 3080b, 3080c, and 3080d, the column decoder 3070 may include first to fourth bank column decoders 3070a, 3070b, 3070c, and 3070d respectively connected to the first to fourth bank arrays 3080a, 3080b, 3080c, and 3080d, and the PIM circuit 122 may include first to fourth processing elements 3085a, 3085b, 3085c, and 3085d respectively connected to the first to fourth bank arrays 3080a, 3080b, 3080c, and 3080d.

The first to fourth bank arrays 3080a, 3080b, 3080c, and 3080d, the first to fourth bank row decoders 3060a, 3060b, 3060c, and 3060d, the first to fourth bank column decoders 3070a, 3070b, 3070c, and 3070d, and the first to fourth processing elements 3085a, 3085b, 3085c, and 3085d may constitute first to fourth memory banks, respectively. Although the first channel CH1 is illustrated as including four memory banks in an embodiment described herein, the inventive concept is not limited thereto. For example, the first channel CH1 may include any number of memory banks according to some embodiments.

The address buffer 310 may receive an address ADDR including a row address (e.g., R[9:0], FIG. 7) and a column address (e.g., C[7:0], FIG. 7) from the memory controller 114. Also, the address buffer 310 may receive a bank address and provide the bank address to a bank control logic, provide the received row address R[9:0] to the row decoder 3060, and provide the received column address C[7:0] to the control logic circuit 126. The bank control logic may generate bank control signals in response to a bank address. In response to bank control signals, a bank row decoder corresponding to a bank address from among the first to fourth bank row decoders 3060a, 3060b, 3060c, and 3060d may be activated and a bank column decoder corresponding to the bank address from among the first to fourth bank column decoders 3070a, 3070b, 3070c, and 3070d may be activated.

The control logic circuit 126 may control all operations of the first channel CH1. The control logic circuit 126 may generate control signals, such that the first channel CH1 performs a write operation, a read operation, a refresh operation, and/or an internal processing operation. The control logic circuit 126 may include the MRS 320 for setting a plurality of operation options of the first channel CH1 and a command decoder 330 for decoding a command CMD received from the memory controller 114.

The MRS 320 may be used to control, for example, a burst length, a read/write latency, a PIM protocol change, and/or a bank architecture. A burst length may be provided to set the maximum number of column locations that may be accessed for a read command and/or a write command. A read/write latency may be provided to define a clock cycle delay between a read and/or write command and a first bit of valid input and/or input data. A PIM protocol change may be provided to set any one of a plurality of PIM protocols. A PIM protocol may be defined as a protocol of a plurality of stages S0, S1, S1.5, and S2 (see FIG. 8) according to the development stage of the PIM protocol. A new version PIM protocol may be referred to as an S2 protocol, and the remaining S0, S1, and S1.5 protocols may be referred to as old version PIM protocols. A bank architecture may be provided for setting the MCA 121 to an all-bank mode or a half bank mode corresponding to even/odd banks. The MRS 320 will be described in further detail below with reference to FIG. 10.

The command decoder 330 may receive the command CMD from the memory controller 114 and determine whether the received command CMD is a normal command designating a normal mode or a PIM command designating an internal processing mode. When it is determined that the received command CMD is a PIM command, the command decoder 330 may provide the PIM command to the CRF 124 of the PIM circuit 122.

The I/O gating circuit may include, together with circuits for gating I/O data DQ, a column selecting circuit, an input data mask logic, read data latches for storing data output from the first to fourth bank arrays 3080a, 3080b, 3080c, and 3080d, and a write driver for writing data to the first to fourth bank arrays 3080a, 3080b, 3080c, and 3080d.

Read data output from one of the first to fourth bank arrays 3080a, 3080b, 3080c, and 3080d may be sensed by sense amplifiers corresponding to one bank array and stored in the read data latches. Write data to be written to an MCA of one of the first to fourth bank arrays 3080a, 3080b, 3080c, and 3080d may be provided from the memory controller 114 to the data I/O buffer 3095. Data provided to the data I/O buffer 3095 may be written to one bank array through the write driver.

Figure 4:
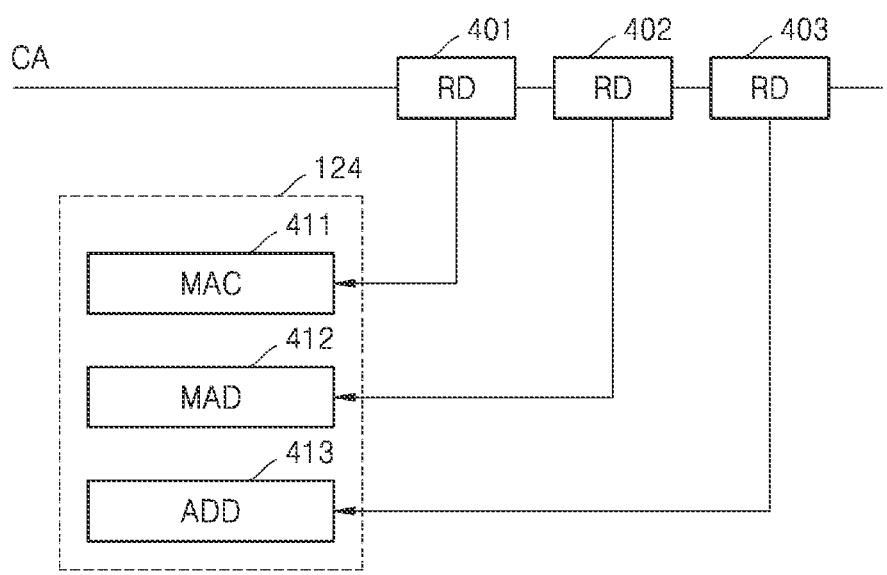
FIGS. 4 and 5 are diagrams illustrating typical processing-in-memory (PIM) protocols.
Figure 5:
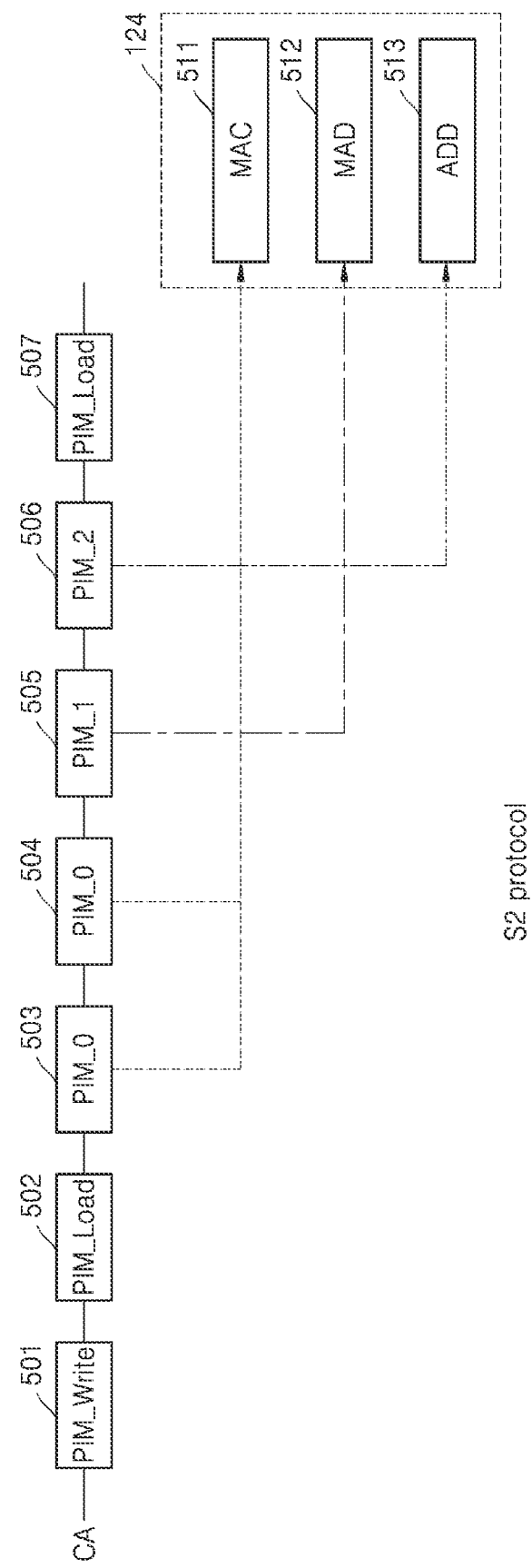

FIGS. 4 and 5 are diagrams illustrating typical PIM protocols. FIG. 4 shows S0, S1, and S1.5 protocols, and FIG. 5 shows an S2 protocol.

Referring to FIGS. 1 and 4, in the S0, S1, and S1.5 protocols, column commands, e.g., a first read command 401, a second read command 402, and a third read command 403, may be sequentially provided from the host device 110 (e.g., the memory controller 114) to the memory device 120 through command/address signal lines CA. The first read command 401, the second read command 402, and the third read command 403 may each be correlated to a PIM command instructing an internal processing operation (e.g., MAC, MAD, or ADD) to be performed by the PIM circuit 122. For example, a MAC operation may indicate an operation a*b+c=c, a MAD operation may indicate an operation a*b+c=d, and an ADD operation may indicate an operation a+b=c. Here, a, b, c, and d may represent information regarding different addresses of the MCA 121 at which corresponding operations are to be performed.

For example, the first read command 401 is associated with a MAC operation and may be configured to read data of addresses a, b, and c of the MCA 121, multiply data of an address a by data of an address b, add data of an address c to the multiplied value, and store the added value in memory cells of the address c. The second read command 402 is associated with a MAD operation and may be configured to read data of addresses a, b, and c of the MCA 121, multiply data of an address a by data of an address b, add data of an address c to the multiplied value, and store the added value in memory cells of the address d. The third read command 403 is associated with an ADD operation and may be configured to read data of addresses a and b of the MCA 121, add data of an address a to data of an address b, and store the added value in memory cells of the address c.

A program counter of the CRF 124 of the memory device 120 may increase by +1 at a time according to the sequential order of the first read command 401, the second read command 402, and the third read command 403. A first PIM command 411 instructing a MAC operation corresponding to the first read command 401, a second PIM command 412 instructing a MAD operation corresponding to the second read command 402, and a third PIM command 413 instructing an ADD operation corresponding to the third read command 403 may be sequentially stored in the CRF 124. As such, in the S0, S1, and S1.5 protocols, based on a correlation between a column command provided from the host device 110 (e.g., the memory controller 114) and a PIM command stored in the CRF 124, a mutually accurate matching between the column command and the PIM command should be achieved.

Referring to FIG. 5, in the S2 protocol, PIM column commands, e.g., a PIM_Write command 501, a PIM_Load command 502, a PIM_0 command 503, a PIM_0 command 504, a PIM_1 command 505, a PIM_2 command 506, and a PIM_Load command 507 may be sequentially provided from the host device 110 (e.g., the memory controller 114) to the memory device 120 through the command/address signal lines CA of the bus 130. For example, PIM execution commands, that is, PIM_0 commands 503 and 504, the PIM_1 command 505, and the PIM_2 command 506 may each instruct internal processing operations (e.g., MAC, MAD, and ADD) to be performed in the PIM circuit 122.

The PIM_0 commands 503 and 504 may indicate a MAC operation indicated by an index 0. The PIM_1 command 505 may indicate a MAD operation indicated by an index 1, and the PIM_2 command 506 may indicate an ADD operation indicated by an index 2. The CRF 124 may store a PIM command corresponding to an index value. A PIM command 511 corresponding to the index 0 indicating a MAC operation corresponding to the PIM_0 commands 503 and 504, a PIM command 512 corresponding to the index 1 indicating a MAD operation corresponding to the PIM_1 command 505, and a PIM command 513 corresponding to the index 2 indicating an ADD operation corresponding to the PIM_2 command 506 may be sequentially stored in the CRF 124. As such, the S2 protocol is configured such that, based on an index value of a PIM execution command provided by the host device 110 (e.g., the memory controller 114), a corresponding PIM execution command is stored in the CRF 124 of the corresponding index value.

FIG. 6 is a diagram illustrating commands according to a typical HBM specification. In FIG. 6, some of commands according to the HBM specification are shown, where the commands may be referred to as normal commands as opposed to PIM commands to be shown in FIG. 7.

Referring to FIG. 6, a normal row command diagram 610 and a normal column command diagram 620 are shown. The normal row command diagram 610 shows an active command ACT, a per-bank precharge command PREpb, and an all-bank precharge command PREab. In an embodiment, in the normal row command diagram 610, normal row commands may further include a row-no operation command RNOP, refresh-related commands REFpb, REFab, SRE, and SRX, a power-down enter/exit command PDE/PDX, etc.

Operands of the active command ACT, the per-bank precharge command PREpb, and the all-bank precharge command PREab are provided at row addresses R[0] to R[9].

In the active command ACT, operands may be provided at row addresses R[0] to R[9] at a first rising edge of a clock signal CK, and additional operands may be input at a first falling edge and a second rising edge of the clock signal CK. Operands (variables, fields, or values indicating certain aspects of the active command ACT) may include PC, SID0 to SID1, BA0 to BA3, and RA0 to RA14 provided by the HBM specification. The PC may indicate a pseudo channel mode. The pseudo channel indicates that each of the channels CH1 to CH8 of the HBM 120 described with reference to FIG. 2 is set to have a data width of 64 bits when configured to operate in two pseudo channel modes. When each of the channels CH1 to CH8 has a data width of 128 bits, it is referred to as a legacy mode. SID0 to SID1 may indicate stack numbers of memory dies stacked on the HBM 120, BA0 to BA3 may indicate bank addresses, and RA0 to RA14 may indicate row addresses. In the per-bank precharge command PREpb, operands PC, SID0 to SID1 and BA0 to BA3 are provided at the row addresses R[0] to R[9] at the rising edge of a clock signal CK, and, in the all-bank precharge command PREab, the operand PC may be provided at the row addresses R[0] to R[9] at the rising edge of the clock signal CK.

The normal column command diagram 620 may include a read command RD, a write command WR, and a mode register command MRScmd. Operands of the read command RD, the write command WR, and the mode register command MRScmd are provided at column addresses C[0] to C[7] and RFU pins. In an embodiment, in the normal column command diagram 620, normal column commands may further include a column-no operation command CNOP, a read command RDA having auto precharge, a write command WRA having auto precharge, etc.

In the read command RD, operands PC, SID0 to SID1, BA0 to BA3, and CA0 to CA4 including variables, fields, or values indicating particular aspects of the read command RD may be provided at the rising edge and the falling edge of a clock signal CK. In the write command WR, operands PC, SID0 to SID1, BA0 to BA3, and CA0 to CA4 including variables, fields, or values indicating particular aspects of the write command WR may be provided at the rising edge and the falling edge of a clock signal CK. In the mode register command MRScmd, operands BA0 to BA3 and OP0 to OP8 including variables, fields, or values indicating particular aspects of the mode register command MRScmd may be provided at the rising edge and the falling edge of a clock signal CK. OP0 to OP8 indicate a plurality of registers included in the MRS 320. Registers OP0 to OP8 may be configured to store parameter codes related to operating conditions of the memory device 120.

FIG. 7 is a diagram illustrating commands according to a typical PIM specification.

Referring to FIG. 7, a PIM row command diagram 710 and a PIM column command diagram 720 are shown. The PIM row command diagram 710 shows examples of an active multi-bank command ACTMb and a precharge multi-bank command PREMb. Operands of the active multi-bank command ACTMb and the precharge multi-bank command PREMb are provided at the row addresses R[0] to R[9].

In the active multi-bank command ACTMb, operands may be provided at row addresses R[0] to R[9] at a first rising edge of a clock signal CK, and additional operands may be input at a first falling edge and a second rising edge of the clock signal CK. Operands (variables, fields, or values indicating certain aspects of the active multi-bank command ACTMb) may include PC, SID0 to SID1, BC0 to BC3, RA0 to RA14, and SIDM provided by the PIM specification. BC0 to BC3 may indicate multi-bank sets, and SIDM may indicate an SID0 mask for rank parallelization. In the precharge multi-bank command PREMb, operands PC, SID0 to SID1, and BC0 to BC3 may be provided at the row addresses R[0] to R[9] at the rising edge of a clock signal CK.

The PIM column command diagram 720 may include a PIM execute command PIM_x, a write PIM broadcast command WRPB, a write PIM command WRP, a PIM read command RDP, and a read-modify-write command RMW. Operands of the PIM execute command PIM_x, the write PIM broadcast command WRPB, the write PIM command WRP, the PIM read command RDP, and the read-modify-write command RMW are provided at an RFU pin and the column addresses C[0] to C[7]. The RFU pin may be referred to as a PIM pin.

In the PIM execute command PIM_x, operands PC, BA0, SID0 to SID1, IID0 to IID5, and CA0 to CA4 may be provided at the RFU pin and the column addresses C[0] to C[7] at the rising edge and the falling edge of a clock signal CK. IID0 to IID5 may indicate instruction identification numbers. CA0 to CA4 may indicate column addresses.

The write PIM broadcast command WRPB is a command for inputting reference data, target data, or target data of an internal processing operation provided from the host device 110 (e.g., the memory controller 114) to a plurality of PIM circuits 122. In the write PIM broadcast command WRPB, operands RID0 to RID7, PC, and SID0 to SID1 may be provided at the RFU pin and the column addresses C[0] to C[7] at the rising edge and the falling edge of a clock signal CK. RID0 to RID may indicate register identification numbers of registers included in the HBM 120, e.g., a vector register, the CRF 124, etc.

The write PIM command WRP is a command for inputting reference data, target data, or target data of an internal processing operation provided from the host device 110 (e.g., the memory controller 114) to one PIM circuit 122. In the write PIM command WRP, operands RID0 to RID7, PC, SID0 to SID1, and BA1 to BA3 may be provided at the RFU pin and the column addresses C[0] to C[7] at the rising edge and the falling edge of a clock signal CK. In the PIM read command RDP, operands RID0 to RID7, PC, SID0 to SID1, and BA1 to BA3 may be provided at the RFU pin and the column addresses C[0] to C[7] at the rising edge and the falling edge of a clock signal CK. In the read-modify-write command RMW, operands POP0 to POP1, PC, SID0 to SID1, BA1 to BA3, and CA0 to CA4 may be provided at the RFU pin and the column addresses C[0] to C[7] at the rising edge and the falling edge of a clock signal CK. POP0 to POP1 indicate PIM operations. V denotes a high (H) or low (L) valid signal.

FIG. 8 is a diagram illustrating an internal processing operation according to a typical PIM protocol. FIG. 8 shows commands used to perform an internal processing operation of the PIM circuit 122 controlled by the host device 110 (e.g., the memory controller 114) in S0, S1, S1.5, and S2 protocols, respectively. For example, internal processing operations may include a Row Parking operation, a HAB mode-in operation, a PIM_Write operation, a MAC operation, and a HAB mode out operation.

A precharge operation may be performed on all banks of the MCA 121 by the Row Parking operation. The HAB mode is an operation for the MCA 121 to enter the half bank mode, and the PIM_Write operation may be performed to input reference data or target data of an internal processing operation provided by the host device 110 (e.g., the memory controller 114) to the PIM circuit 122. The MAC operation may be performed to read data of addresses a, b, and c of the MCA 121, multiply data of an address a by data of an address b, add data of an address c to the multiplied value, and store the added value to memory cells of the address C, and the HAB mode-out operation may be performed to exit the half bank mode of the MCA 121.

In the S0 protocol, the Row Parking operation may be configured to be performed when a particular address (e.g., 0x3000) is applied together with an active command ACT 801. The HAB mode-in operation may be configured to be performed when a particular address (e.g., 0x27ff) is applied together with an active command ACT 802. The PIM_Write operation may be configured to be performed when a write command WR 804 is applied after a particular address (e.g., 0x3fff) is applied together with an active command ACT 803. The MAC operation may be configured to be performed when a read command RD 806 is applied after a particular address (e.g., 0x0) is applied together with an active command ACT 805. The HAB mode-out operation may be configured to be performed when a particular address (e.g., 0x2fff) is applied together with a precharge command PRE 808 after the particular address (e.g., 0x2fff) is applied together with an active command ACT 807. Thereafter, a particular address (e.g., 0x3000) may be applied together with an active command ACT 809 for the Row Parking operation. The S0 protocol may be referred to as a legacy mode of a PIM protocol.

In the S1 protocol, the Row Parking operation may be configured to be performed when an all-bank precharge command PREab 811 is applied. The HAB mode-in operation may be configured to be performed when a particular address (e.g., RA_x) is applied together with an active command ACT 812 and a particular signal is applied to the RFU pin. The PIM_Write operation may be configured to be performed when a write command WR 814 is applied after a particular address (e.g., 0x3fff) and a particular signal of the RFU pin are applied together with an active command ACT 813. The MAC operation may be configured to be performed when a read command RD 816 is applied after a particular address (e.g., 0x0) is applied together with an active command ACT 815. The HAB mode-out operation may be configured to be performed when a particular address (e.g., RA_x) and a particular signal of the RFU pin are applied together with an active command ACT 817. Thereafter, the Row Parking operation may be configured to be performed when the all-bank precharge command PREab 811 is applied. As compared to the S0 protocol, the S1 protocol is controlled by using an RFU pin, and thus the S1 protocol may be referred to as an RFU control legacy mode.

In the S1.5 protocol, the Row Parking operation is not utilized. The HAB mode-in operation may be configured to be performed when a particular address (e.g., 0xx) is applied together with a multi-bank active command ACTMb 821. The PIM_Write operation may be configured to be performed when a PIM_WR command 822 is applied. The MAC operation may be configured to be performed when a read command RD 823 is applied. The HAB mode-out operation and the Row Parking operation may be configured to be performed when a particular address (e.g., 0x0) is applied together with an all-bank precharge command PREab 824.

In the S2 protocol, the Row Parking operation is not utilized. The HAB mode-in operation may be configured to be performed when a particular address (e.g., 0xx) is applied together with a multi-bank active command ACTMb 831. The PIM_Write operation may be configured to be performed when a PIM_WR command 832 is applied. The MAC operation may be configured to be performed when a PIM_x command 833 is applied. The HAB mode-out operation and the Row Parking operation may be configured to be performed when a particular address (e.g., 0x0) is applied together with a multi-bank precharge command PREMb 834.

Since the S1.5 protocol uses some PIM commands (e.g., ACTMb, PIM_WR, and PREMb) unlike the S0 and S1 protocols using normal commands, the S1.5 protocol may be referred to as a partial command driving mode. Since the S2 protocol uses PIM commands (e.g., ACTMb, PIM_WR, and PREMb) overall, the S2 protocol may be referred to as a full command driving mode or a command driving mode. Also, as shown, the numbers of control operations 821 to 824 and 831 to 834 of the S1.5 and S2 protocols are significantly less than the numbers of control operations 801 to 809 and 811 to 818 of S0 and S1 protocols.

FIG. 9 is a diagram illustrating memory allocation according to a typical PIM protocol.

Referring to FIGS. 8 and 9, in the S0 protocol, particular addresses (e.g., 0x3fff, 0x27ff, and 0x2fff) applied together with the active command ACT may designate a first region 901 of the MCA 121. Since the particular addresses (e.g., 0x3fff, 0x27ff, and 0x2fff) are fixed for an internal processing operation of the PIM circuit 122, the first region 901 may be allocated as an empty space in terms of a memory operation. Therefore, a region that may be used in the S0 protocol may be limited to a second region 902 in an entire region 900 of the MCA 121.

In the S2 protocol, an internal processing operation of the PIM circuit 122 may be performed by using the entire region 900 of the MCA 121 according to flexible address control information set in the MRS 320. According to some embodiments, a host vendor may configure to use the entire region 900 of the MCA 121 for an internal processing operation of the PIM circuit 122 in the S2 protocol by using a specifiable TMRS or an IEEE1500 interface for testing the HBM 120.

Figure 10:
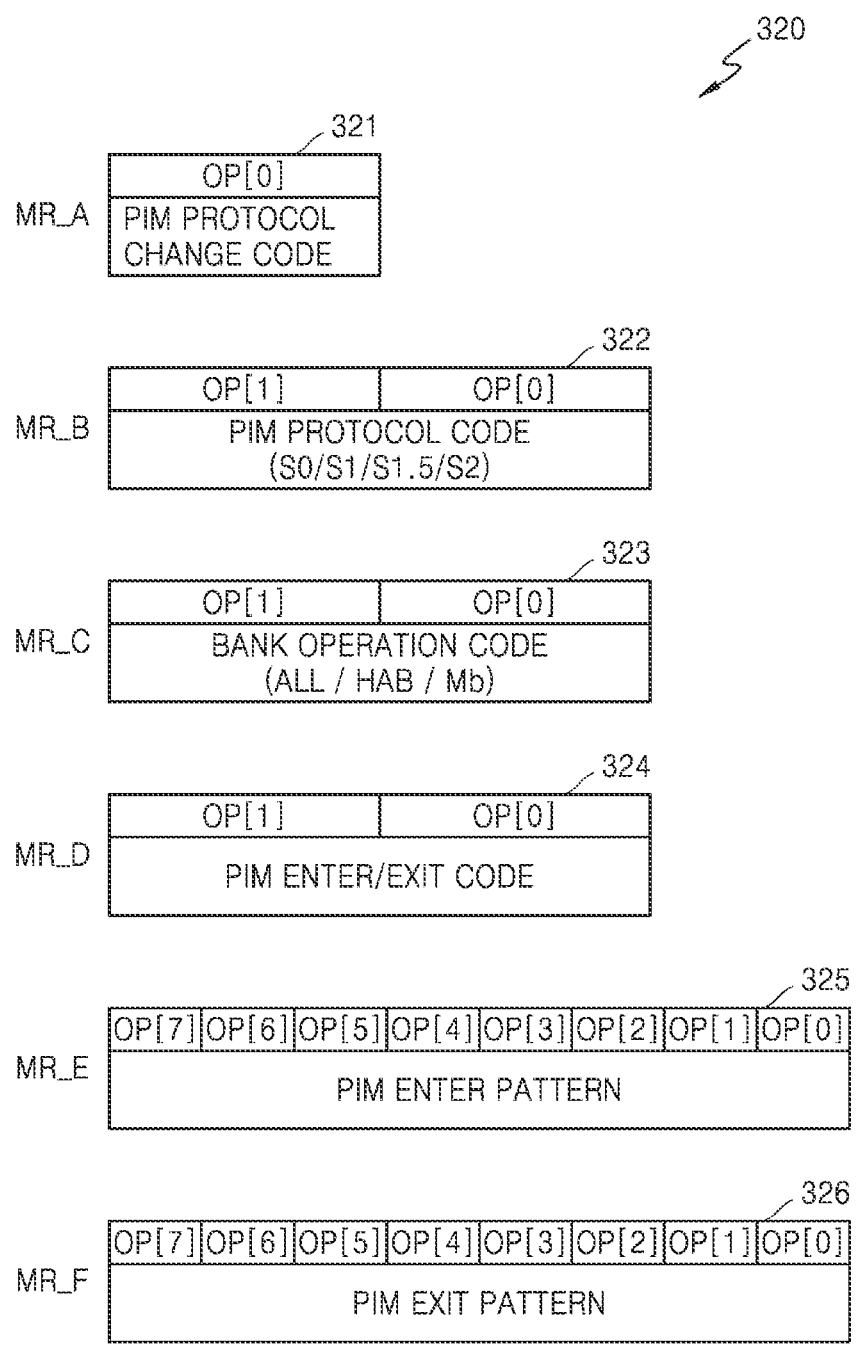
FIG. 10 is a diagram illustrating a portion of a mode register set (MRS) according to embodiments.

FIG. 10 is a diagram illustrating a portion of an MRS according to embodiments.

Referring to FIG. 10, the MRS 320 may include a first mode register 321, a second mode register 322, a third mode register 323, a fourth mode register 324, a fifth mode register 325, and a sixth mode register 326. First to sixth mode registers 321 to 326 each represent a group of registers associated with each mode register, which may be identified by each mode register address. The first mode register 321 may be identified by a first mode register address MR_A, the second mode register 322 may be identified by a second mode register address MR_B, the third mode register 323 may be identified by a third mode register address MR_C, the fourth mode register 324 may be identified by a fourth mode register address MR_D, the fifth mode register 325 may be identified by a fifth mode register address MR_E, and the sixth mode register 326 may be identified by a sixth mode register address MR_F. The first to sixth mode registers 321 to 326 may include a plurality of registers OP[7:0].

The first mode register 321 may store a PIM protocol change code indicating whether a PIM protocol change is supported. The first mode register 321 may store a PIM protocol change code by using, for example, a register OP[0] from among the registers OP[7:0]. A PIM protocol change code stored in the register OP[0] may be expressed by a 1-bit parameter code. According to some embodiments, a PIM protocol change code may be expressed using more than 1 bit.

The second mode register 322 may store a PIM protocol code applied to set a PIM protocol. When the PIM protocol change code indicating whether a PIM protocol change is supported by the register OP[0] of the first mode register 321 is enabled, a corresponding PIM protocol may be set by applying the PIM protocol code of the second mode register 322. Any one of S0, S1, S1.5, and S2 protocols may be set as the PIM protocol by the PIM protocol code. The second mode register 322 may store a PIM protocol code by using, for example, a register OP[1:0] from among the registers OP[7:0]. A PIM protocol code stored in the register OP[1:0] may be expressed by a 2-bit parameter code. According to some embodiments, a PIM protocol code may be expressed in less than or more than 2-bits.

The third mode register 323 may store a bank operation code indicating which bank architecture the HBM 120 operates with in relation to a PIM protocol. By the bank operation code, the HBM 120 may set any one of an all-bank mode ALL, a half-bank mode HAB, and a multi-bank mode Mb as the bank architecture of a PIM protocol. The third mode register 323 may store a bank operation code by using, for example, a register OP[1:0] from among the registers OP[7:0]. A bank operation code stored in the register OP[1:0] may be expressed by a 2-bit parameter code. According to some embodiments, a bank operation code may be expressed in less than or more than 2-bits.

The fourth mode register 324 may store a PIM enter/exit code indicating in which pattern the entry or the exit of a PIM mode is to be identified. The PIM enter/exit code may indicate which of a row address pattern (e.g., FIG. 11), a column address (e.g., FIG. 12), and a data pattern (e.g., FIG. 13) is used to identify enter/exit of a PIM mode. The fourth mode register 324 may store a PIM enter/exit code by using, for example, a register OP[1:0] from among the registers OP[7:0]. A PIM enter/exit code stored in the register OP[1:0] may be expressed by a 2-bit parameter code. According to some embodiments, a PIM enter/exit code may be expressed in less than or more than 2 bits.

The fifth mode register 325 may store a PIM entry pattern for entering a PIM mode, and the sixth mode register 326 may store a PIM exit pattern for exiting the PIM mode. The fifth mode register 325 and the sixth mode register 326 may store a PIM entry pattern and a PIM exit pattern by using a plurality of registers OP[7:0], respectively. PIM enter/exit patterns stored in the registers OP[7:0] may be expressed by an 8-bit parameter code. According to some embodiments, PIM enter/exit patterns may be expressed in less than 8 bits.

Figure 11:
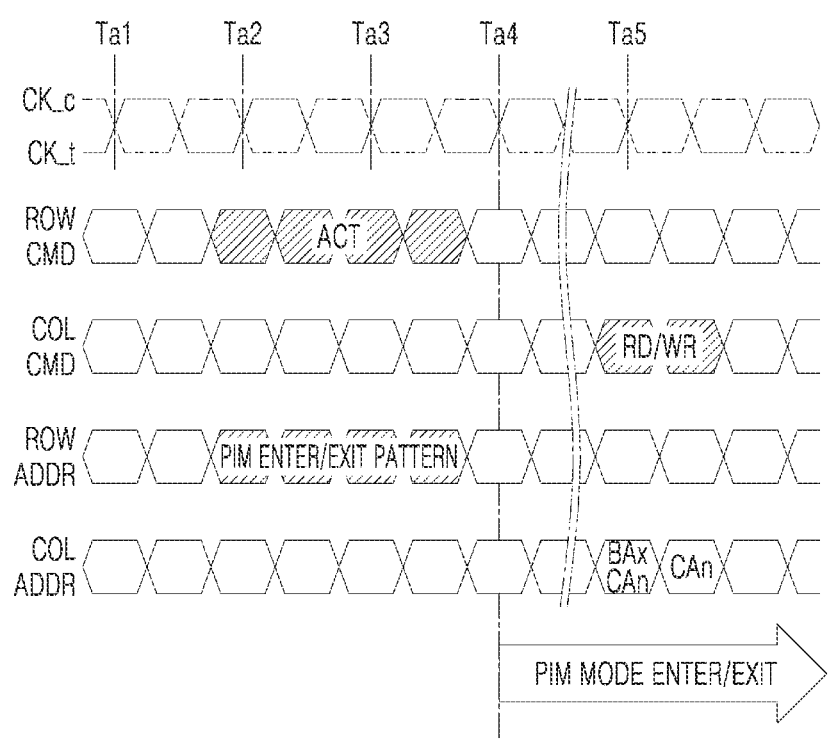
FIGS. 11 to 13 are diagrams illustrating examples of PIM operations of a memory device according to embodiments.
Figure 12:
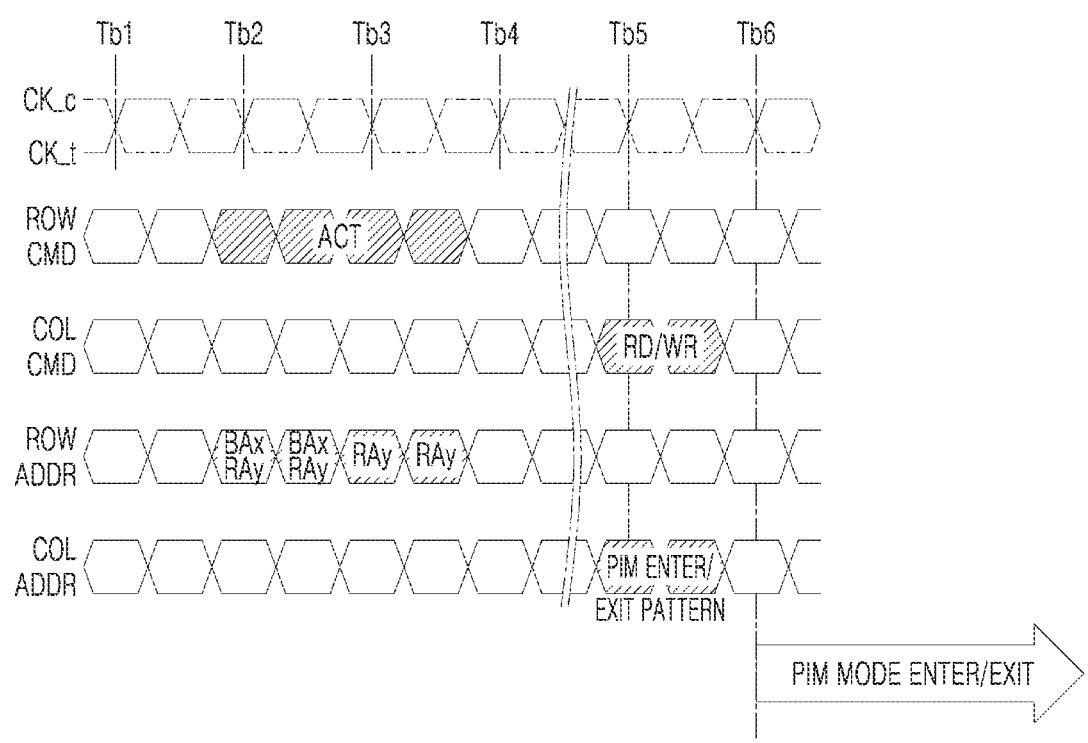
Figure 13:
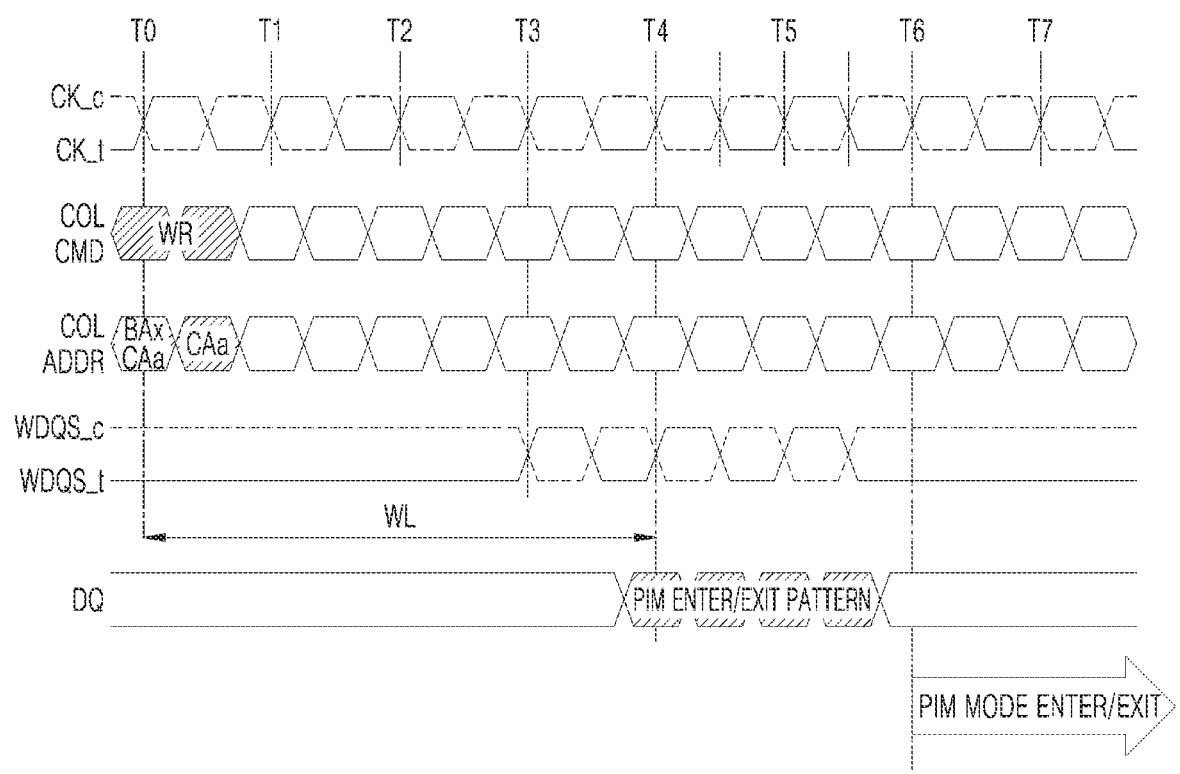

FIGS. 11 to 13 are diagrams illustrating examples of PIM operations of a memory device according to embodiments. FIG. 11 shows an operation of the memory device 120 including the PIM circuit 122 to enter/exit a PIM mode based on a row address pattern. FIG. 12 shows an operation of the memory device 120 including the PIM circuit 122 to enter/exit a PIM mode based on a column address pattern. FIG. 13 shows an operation of the memory device 120 including the PIM circuit 122 to enter/exit a PIM mode based on a data pattern. In timing diagrams shown in FIGS. 11 to 13, the horizontal axis and the vertical axis represent time and voltage levels, respectively.

Referring to FIGS. 1, 10, and 11, the memory device 120 may analyze and detect a parameter code regarding a PIM protocol set in the MRS 320 by using the PPD 127 of the control logic circuit 126 and enter/exit a PIM mode. At a time point Ta2, the active command ACT, which is a row command ROW CMD, may be received by the memory device 120 in synchronization with a clock signal CK. At this time, a row address ROW ADDR may be received together with the active command ACT. When it is determined at the time point Ta2 that the row address ROW ADDR received together with the active command ACT is identical to a PIM entry pattern, the memory device 120 may enter a PIM mode at a time point Ta4.

At a time point Ta5, the memory device 120 may receive a column address COL ADDR together with a read command RD or a write command WR, which is a column command COL CMD, in synchronization with the clock signal CK. The column address COL ADDR may include a bank address BAx and a column address CAx. The read command RD or the write command WR may be performed in association with an internal processing operation of the PIM circuit 122.

According to some embodiments, when it is determined at the time point Ta2 that the row address ROW ADDR received together with the active command ACT is identical to a PIM exit pattern, the memory device 120 may exit the PIM mode at the time point Ta4.

Referring to FIG. 12, at a time point Tb2, the memory device 120 may receive the row address ROW ADDR together with the active command ACT in synchronization with the clock signal CK. The row address ROW ADDR may include the bank address BAx and a row address RAy.

At a time point Tb5, the memory device 120 may receive the column address COL ADDR together with the read command RD or the write command WR in synchronization with the clock signal CK. When it is determined that the column address COL ADDR received together with the read command RD or the write command WR is identical to a PIM entry pattern, the memory device 120 may enter a PIM mode at a time point Tb6. According to some embodiments, when it is determined that the column address COL ADDR received together with the read command RD or the write command WR is identical to a PIM exit pattern, the memory device 120 may exit the PIM mode at the time point Tb6.

Referring to FIG. 13, at a time point T0, the memory device 120 may receive the column address COL ADDR together with the write command WR in synchronization with the clock signal CK. The column address COL ADDR may include a bank address BAx and a column address CAx. After a write latency WL elapses from the time point T0, for example, write data DQ may be received at a time point T4 at which WL=4. The time between the time point T0 and the time point T4 corresponds to the preparation time for a memory operation of writing write data DQ to be received in synchronization with a write data strobe signal WDQS to the MCA 121 corresponding to the bank address BAx and the column address CAa.

At the time point T4, the write data DQ may be received in synchronization with the write data strobe signal WDQS. When it is determined that the write data DQ is identical to a PIM entry pattern, the memory device 120 may enter a PIM mode at a time point T6. According to some embodiments, when it is determined that the write data DQ is identical to a PIM exit pattern, the memory device 120 may exit the PIM mode at the time point T6.

Figure 14:
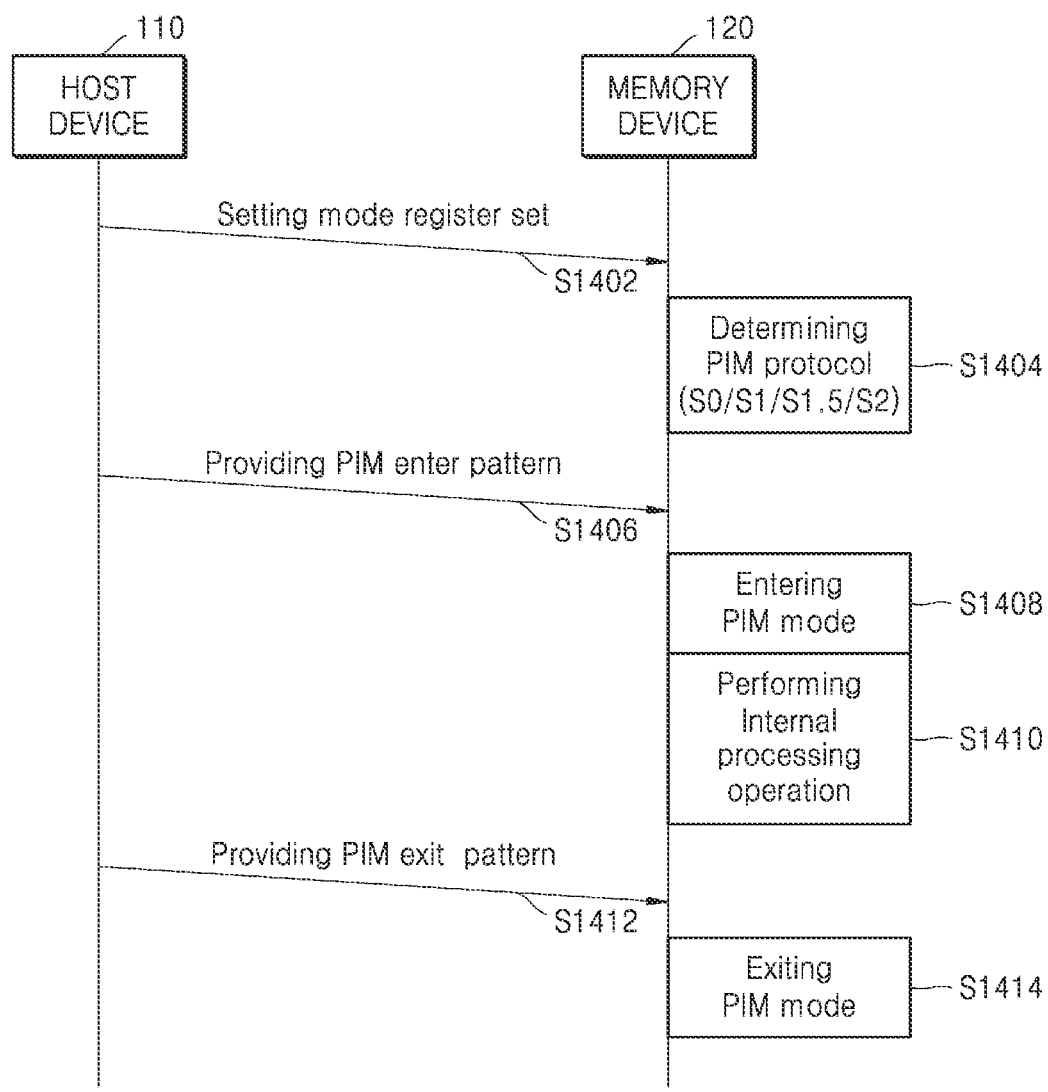
FIG. 14 is a diagram illustrating operations and communications of a backward-compatible PIM protocol between the host device 110 and the memory device 120 of FIG. 1 according to embodiments.

FIG. 14 is a diagram illustrating operations and communications of a backward-compatible PIM protocol between the host device 110 and the memory device 120 of FIG. 1 according to embodiments.

Referring to FIGS. 1 and 14, in operation S1402, the host device 110 (e.g., the memory controller 114) may provide the mode register command MRScmd to the memory device 120 via the bus 130 to set the MRS 320 of the memory device 120. The memory controller 114 may provide a parameter code consisting of appropriate bit values to the memory device 120 through command/address lines CA of the bus 130 when issuing the mode register command MRScmd. The MRS 320 of the memory device 120 may be programmed by the memory controller 112 to set a plurality of operation parameters, options, various functions, characteristics, and modes of the memory device 120. For example, referring to FIG. 10, a PIM protocol change code, a PIM protocol code, a bank operation code, a PIM enter/exit code, a PIM enter/exit pattern, etc. may be set in the MRS 320.

In operation S1404, the memory device 120 may determine a set PIM protocol by analyzing and detecting a PIM protocol change code and a PIM protocol code stored in the MRS 320. For example, referring to FIG. 8, the memory device 120 may determine a corresponding PIM protocol from among S0, S1, S1.5, and S2 protocols.

In operation S1406, the memory controller 114 may provide a PIM entry pattern to the memory device 120 through the bus 130. For example, referring to FIGS. 11 to 13, a PIM entry code may be provided in the form of a particular row address pattern, a particular column address pattern, or a particular data pattern.

In operation S1408, the memory device 120 may enter a corresponding PIM protocol determined in operation S1406.

In operation S1410, the PIM circuit 122 of the memory device 120 may perform an internal processing operation by using the corresponding PIM protocol.

In operation S1412, the memory controller 114 may provide a PIM exit pattern to the memory device 120 through the bus 130. For example, referring to FIGS. 11 to 13, a PIM exit code may be provided in the form of a particular row address pattern, a particular column address pattern, or a particular data pattern.

In operation S1414, the memory device 120 may exit a PIM protocol being executed in response to the PIM exit pattern.

In embodiments described above, the host device 110 (e.g., the memory controller 114) and the memory device 120 may minimize or reduce interface changes for supporting a backward-compatible PIM protocol, which may increase the performance of the system 100 and reduce the manufacturing cost.

Figure 15:
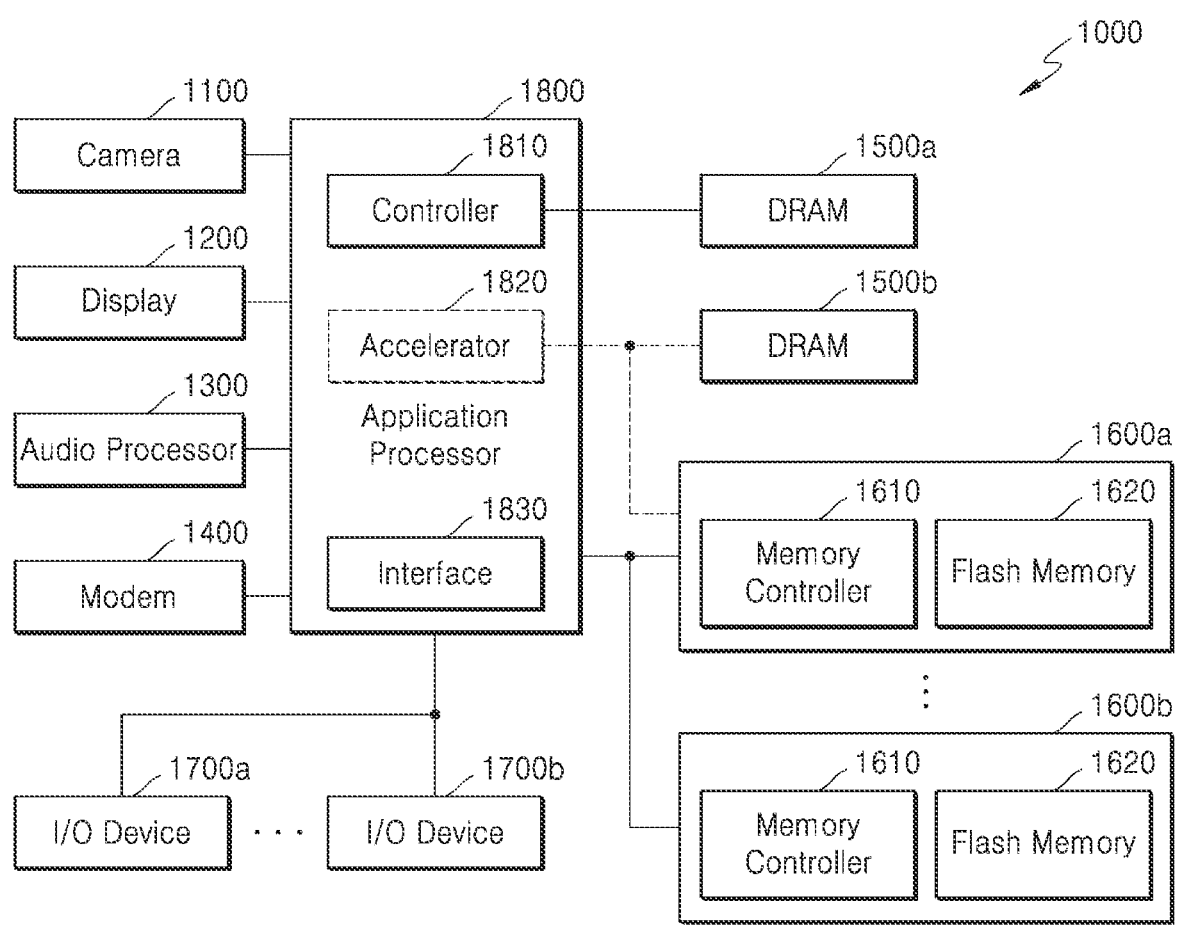
FIG. 15 is a block diagram illustrating a system for performing an operation of a backward-compatible PIM protocol according to embodiments.

FIG. 15 is a block diagram illustrating a system 1000 for performing an operation of a backward-compatible PIM protocol according to embodiments.

Referring to FIG. 15, the system 1000 may include a camera 1100, a display 1200, an audio processor 1300, a modem (1400), DRAMs 1500$a$ and 1500$b$, flash memories 1600$a$ and 1600$b$, I/O devices 1700$a$ and 1700$b$, and an application processor (AP) 1800. The system 1000 may be implemented as, for example, a laptop computer, a mobile phone, a smartphone, a tablet personal computer (PC), a wearable device, a healthcare device, or an Internet Of Things (JOT) device, a server or a PC (e.g., a desktop PC).

The camera 1100 may capture a still image or a moving picture (e.g., video) according to a user's control and may store captured image/video data or transmit the captured image/video data to the display 1200. The audio processor 1300 may process audio data included in the flash memory devices 1600$a$ and 1600$b$ or network content. The modem 1400 may modulate and transmit a signal for wired/wireless data transmission/reception, and a modulated signal may be demodulated by a receiver to restore an original signal. The I/O devices 1700$a$ and 1700$b$ may include devices providing a digital input function and/or digital output function, e.g., a Universal Serial Bus (USB), a storage, a digital camera, a Secure Digital (SD) card, a Digital Versatile Disc (DVD), a network adapter, a touch screen, etc.

The AP 1800 may control the overall operation of the system 1000. The AP 1800 may control the display 1200 such that a part of content stored in the flash memory devices 1600a and 1600b is displayed on the display 1200. When a user input is received through the I/O devices 1700a and 1700b, the AP 1800 may perform a control operation corresponding to the user input. The AP 1800 may include an accelerator block, which is a circuit dedicated for calculation of Artificial Intelligence (AI) data, or may include an accelerator chip 1820 that is separate from the AP 1800. The DRAM 1500b may be additionally provided in the accelerator block or accelerator chip 1820. The accelerator is a function block that specializes in performing a particular function of the AP 1800 and may include, for example, a GPU, which is a function block that specializes in processing graphic data, a neural processing unit (NPU), which is a block that specializes in AI calculation and inference, and a data processing unit (DPU), which is a block that specializes in data transmission.

The system 1000 may include a plurality of DRAMs 1500a and 1500b. The AP 1800 may set up a DRAM interface protocol and communicate (with the DRAMs 1500a and 1500b) to control the DRAMs 1500a and 1500b through commands complying with the JEDEC standard and mode register (MRS) setting or to use company-specific functions such as, for example, providing low voltage/high-speed/reliability and a cyclic redundancy check (CRC)/error correction code (ECC) function. For example, the AP 1800 may communicate with the DRAM 1500a through an interface complying with the JEDEC standards such as, for example, LPDDR4, LPDDR5, and HBM, and the accelerator block or accelerator chip 1820 may set and use a new DRAM interface protocol to control the DRAM 1500b for an accelerator, which has a greater bandwidth than the DRAM 1500a.

Although FIG. 15 shows only the DRAMs 1500a and 1500b, the inventive concept is not limited thereto. For example, according to embodiments, as long as a bandwidth, a response speed, and voltage conditions of the AP 1800 or the accelerator chip 1820 are satisfied, any memory such as, for example, a PRAM, an SRAM, an MRAM, an RRAM, an FRAM, or a Hybrid RAM may be used. The DRAMs 1500a and 1500b have relatively small latency and bandwidth compared to the I/O devices 1700a and 1700b or the flash memories 1600a and 1600b. The DRAMs 1500a and 1500b are initialized when the system 1000 is powered on and the OS and application data are loaded thereto, and thus, the DRAMs 1500a and 1500b may be used as temporary storages for the OS and the application data or may be used as execution spaces for various software codes.

In the DRAMs 1500a and 1500b, four arithmetic operations (e.g., addition, subtraction, multiplication, and division), vector calculations, address calculations, or Fast Fourier Transform (FFT) calculations may be performed. Also, in the DRAMs 1500a and 1500b, a function for an operation used for an inference may be performed. Here, the inference may be performed in a deep learning algorithm using an artificial neural network. The deep learning algorithm may include a training operation for learning a model through various data and an inference operation for recognizing data with the trained model. According to an embodiment, an image captured by a user through the camera 1100 is signal-processed and stored in the DRAM 1500b, and the accelerator block or accelerator chip 1820 may perform AI data calculation for recognizing data using data stored in the DRAM 1500b and a function used for inference.

The system 1000 may include a plurality of storages or a plurality of flash memories 1600a and 1600b having a larger capacity than the DRAMs 1500a and 1500b. The accelerator block or accelerator chip 1820 may perform a training operation and an AI data calculation using the flash memory devices 1600a and 1600b. In an embodiment, the flash memories 1600a and 1600b may more efficiently perform the training operation and the inference operation for AI data calculation, which are performed by the AP 1800 and/or the accelerator chip 1820 using a computing device provided in the memory controller 1610. The flash memories 1600a and 1600b may store images captured through the camera 1100 or data transmitted through a data network. For example, the flash memories 1600a and 1600b may store Augmented Reality/Virtual Reality content, High Definition (HD) content, or Ultra High Definition (UHD) content.

In the system 1000, DRAMs 1500a and 1500b may be configured to support a backward-compatible PIM protocol. The DRAMs 1500a and 1500b may each include a PIM circuit configured to perform internal processing operations and may include an MRS for storing a PIM protocol change code, a PIM protocol code, a bank operation code, a PIM enter/exit code, and/or a PIM enter/exit pattern. The PIM circuits of the DRAMs 1500a and 1500b may perform internal processing operations based on a currently operating PIM protocol set from among a plurality of PIM protocols.

Referring to a comparative example, a PIM protocol between a host device and a memory device may be performed by a particular PIM command according to a PIM specification. As PIM commands are added and, for simplification of PIM processing operations, the PIM specification may be modified. When the PIM specification is modified to support a new version of a PIM protocol, it may be desirable for the PIM specification to be backward-compatible to support a PIM protocol of an older version. However, a backward-compatible PIM protocol may involve complicated hardware configurations of a host device and a memory device and software changes, such as a data packet format. Therefore, the number of commands to be issued by a host device in relation to a backward-compatible PIM is greatly increased in such a comparative example, which may significantly affect the process efficiency, and increase the cost, of a computing system of the comparative example. Embodiments of the present application account for this by providing a memory device that efficiently supports a backward compatible PIM protocol, as described above.

While the inventive concept has been particularly shown and described with reference to embodiments thereof, it will be understood that various changes in form and detail may be made therein without departing from the spirit and scope of the inventive concept as defined by the following claims.

What is claimed is:

1. A memory device supporting a processing-in-memory (PIM) protocol, the memory device comprising:
a mode register set (MRS) configured to store a first parameter code and a second parameter code in a first register and a second register, respectively, the PIM protocol comprises a plurality of PIM protocols including a first PIM protocol and a second PIM protocol,
wherein the first parameter code comprises a PIM protocol change code indicating whether the memory device supports the first PIM protocol, and the second parameter code comprises a PIM protocol code for setting a current operation PIM protocol based on the first PIM protocol and the second PIM protocol; and a PIM circuit configured to perform an internal processing operation based on the current operation PIM protocol,
wherein a version of the first PIM protocol is older than a version of the second PIM protocol, the first PIM protocol being a backward-compatible PIM protocol.

2. The memory device of claim 1, further comprising:
a memory cell array comprising a plurality of memory banks,
wherein the MRS stores a bank operation code for setting a bank architecture mode of the memory cell array in relation to the current operation PIM protocol in a third register.

3. The memory device of claim 2, wherein the memory device is configured to operate the memory cell array in any one of an all-bank mode, a half-bank mode, and a multi-bank mode according to the bank operation code.

4. The memory device of claim 1, wherein the MRS stores, in a third register, a PIM enter/exit code that identifies entry or exit of a PIM mode for performing the internal processing operation in relation to the current operation PIM protocol.

5. The memory device of claim 4, wherein the PIM enter/exit code is set to any one of a row address pattern, a column address pattern, and a data pattern of the memory device.

6. The memory device of claim 5, wherein the MRS stores, in a fourth register, a PIM entry pattern for entering the PIM mode in relation to the PIM enter/exit code.

7. The memory device of claim 5, wherein the MRS stores, in a fourth register, a PIM exit pattern for exiting the PIM mode in relation to the PIM enter/exit code.

8. The memory device of claim 1, wherein the memory device is configured to perform a normal memory operation according to a normal command and to perform the internal processing operation according to a PIM command,
wherein the normal command is different from the PIM command and is used to perform the normal memory operation that is different from the internal processing operation, and
the second PIM protocol comprises an S2 protocol corresponding to a full command driving mode configured to perform the internal processing operation based on the PIM command.

9. The memory device of claim 8, wherein the first PIM protocol comprises at least one of:
an S0 protocol, which corresponds to a legacy mode configured to perform the internal processing operation by using the normal command and a first particular row address,
an S1 protocol, which corresponds to a reserved-for-future-use (RFU) control legacy mode configured to perform the internal processing operation by using an RFU pin in addition to the legacy mode, or
an S1.5 protocol, which corresponds to a partial command driving mode configured to perform the internal processing operation by using some of a plurality of PIM commands and a second particular row address.

10. The memory device of claim 1, wherein the memory device is a high-bandwidth memory (HBM) device.

11. The memory device of claim 1, wherein the MRS is included in a test mode register set (TMRS) or an IEEE1500 interface used for testing the memory device.

12. A host device coupled to a memory device that is configured to perform internal processing operations, the host device comprising:
a memory controller configured to;
set a processing-in-memory (PIM) protocol code in a mode register set (MRS) of the memory device, the PIM protocol change code indicating whether the memory device supports a first PIM protocol among a plurality of PIM protocols,
the PIM protocol code being used for setting a current operation PIM protocol based on the first PIM protocol and a second PIM protocol among the plurality of PIM protocols,
wherein the memory controller is configured to control a PIM circuit of the memory device to perform an internal processing operation based on the current operation PIM protocol, and
wherein a version of the first PIM protocol is older than a version of the second PIM protocol, the first PIM protocol being a backward-compatible PIM protocol.

13. The host device of claim 12, wherein the memory controller is configured to cause the memory device to set a bank operation mode for a plurality of memory banks of the memory device in association with the current operation PIM protocol.

14. The host device of claim 13, wherein the bank operation mode comprises any one of an all-bank mode, a half-bank mode, and a multi-bank mode.

15. The host device of claim 12, wherein the memory controller is configured to set a PIM enter/exit code that identifies entry or exit of the memory device to or from a PIM mode in which the PIM circuit performs the internal processing operation in relation to the current operation PIM protocol.

16. The host device of claim 15, wherein the memory controller sets the PIM enter/exit code to any one of a row address pattern, a column address pattern, and a data pattern of the memory device.

17. The host device of claim 16, wherein the memory controller is configured to set a PIM entry pattern in which the memory device enters the PIM mode in relation to the PIM enter/exit code.

18. The host device of claim 16, wherein the memory controller is configured to set a PIM exit pattern in which the memory device exits the PIM mode in relation to the PIM enter/exit code.

19. The host device of claim 12, wherein the memory controller is configured to set the current operation PIM protocol to the second PIM protocol, the second PIM protocol comprising an S2 protocol, which corresponds to a full command driving mode for performing the internal processing operation based on a PIM.

20. The host device of claim 19, wherein the memory controller is configured to set the current operation PIM protocol to the first PIM protocol, the first PIM protocol comprising at least one of:
an S0 protocol, which corresponds to a legacy mode configured to perform the internal processing operation by using a normal command and a first particular row address, wherein the normal command is different from the PIM command and is used to perform a normal memory operation that is different from the internal processing operation,
an S1 protocol, which corresponds to a reserved-for-future-use (RFU) control legacy mode configured to perform the internal processing operation by using an RFU pin in addition to the legacy mode, or
an S1.5 protocol, which corresponds to a partial command driving mode configured to perform the internal processing operation by using some of a plurality of PIM commands and a second particular row address.

* * * * *